United States Patent
Chen et al.

(10) Patent No.: US 11,693,693 B2
(45) Date of Patent: Jul. 4, 2023

(54) RESOURCE MANAGEMENT BASED ON RANKING OF IMPORTANCE OF APPLICATIONS

(71) Applicant: HUAWEI TECHNOLOGIES CO., LTD., Guangdong (CN)

(72) Inventors: Qiulin Chen, Shanghai (CN); Hanbing Chen, Shenzhen (CN); Zhi Kang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 453 days.

(21) Appl. No.: 16/845,382

(22) Filed: Apr. 10, 2020

(65) Prior Publication Data
US 2020/0241917 A1 Jul. 30, 2020

Related U.S. Application Data

(63) Continuation of application No. PCT/CN2018/109753, filed on Oct. 11, 2018.

(30) Foreign Application Priority Data

Oct. 13, 2017 (CN) .......................... 201710953233.7

(51) Int. Cl.
*G06F 9/48* (2006.01)
*G06F 9/50* (2006.01)
(Continued)

(52) U.S. Cl.
CPC .......... *G06F 9/4843* (2013.01); *G06F 9/3836* (2013.01); *G06F 9/4881* (2013.01);
(Continued)

(58) Field of Classification Search
None
See application file for complete search history.

(56) References Cited

U.S. PATENT DOCUMENTS 7,716,151 B2 * 5/2010 Tiwari ................ G06F 11/3447
703/22
10,402,733 B1 * 9/2019 Li .......................... G06N 20/20
(Continued)

FOREIGN PATENT DOCUMENTS

| CN | 101414270 A | 4/2009 |
| CN | 101923382 A | 12/2010 |

(Continued)

*Primary Examiner* — Abu Zar Ghaffari
(74) *Attorney, Agent, or Firm* — Huawei Technologies Co., Ltd

(57) ABSTRACT

This application provides a method for managing a resource in a computer system and a terminal device. The method includes: obtaining data, where the data includes application sequence feature data related to a current foreground application, and the data further includes at least one of the following real-time data: a system time of the computer system, current status data of the computer system, and current location data of the computer system; selecting, from a plurality of machine learning models based on at least one of the real-time data, a target machine learning model that matches the real-time data; inputting the obtained data into the target machine learning model to rank importance of a plurality of applications installed in the computer system; and performing resource management based on a result of the importance ranking.

19 Claims, 12 Drawing Sheets

(51) Int. Cl.
  *G06N 20/00* (2019.01)
  *G06F 9/38* (2018.01)
  *G06F 18/22* (2023.01)
  *G06F 18/20* (2023.01)
  *G06F 18/2113* (2023.01)

(52) U.S. Cl.
  CPC .............. *G06F 9/50* (2013.01); *G06F 9/5038* (2013.01); *G06F 18/2113* (2023.01); *G06F 18/22* (2023.01); *G06F 18/285* (2023.01); *G06N 20/00* (2019.01)

(56) References Cited

U.S. PATENT DOCUMENTS

| | | | |
|---|---|---|---|
| 2007/0288414 A1* | 12/2007 | Barajas | G06N 20/00 706/46 |
| 2008/0005736 A1 | 1/2008 | Apacible et al. | |
| 2013/0326166 A1 | 12/2013 | Desai et al. | |
| 2014/0013332 A1 | 1/2014 | Wei et al. | |
| 2014/0180741 A1* | 6/2014 | Franke | G06Q 10/063112 705/7.14 |
| 2014/0372356 A1* | 12/2014 | Bilal | G06N 5/02 706/46 |
| 2014/0379619 A1* | 12/2014 | Permeh | G06F 9/5038 706/12 |
| 2015/0149514 A1 | 5/2015 | Kim et al. | |
| 2017/0302521 A1* | 10/2017 | Lui | H04L 67/10 |
| 2019/0079796 A1* | 3/2019 | Asahara | G06F 9/4881 |
| 2019/0095250 A1* | 3/2019 | Qiang | G06F 9/5005 |
| 2020/0034197 A1* | 1/2020 | Nagpal | G06F 9/50 |

FOREIGN PATENT DOCUMENTS

| | | |
|---|---|---|
| CN | 103257898 A | 8/2013 |
| CN | 103430151 A | 12/2013 |
| CN | 102891916 B | 1/2016 |
| CN | 105939416 A | 9/2016 |
| CN | 106055399 A | 10/2016 |
| CN | 106055406 A | 10/2016 |
| CN | 106201685 A | 12/2016 |
| CN | 106354371 A | 1/2017 |
| CN | 106941713 A | 7/2017 |
| EP | 2672781 B1 | 11/2016 |

* cited by examiner

RESOURCE MANAGEMENT BASED ON RANKING OF IMPORTANCE OF APPLICATIONS

CROSS-REFERENCE TO RELATED APPLICATIONS

This application is a continuation of International Application No. PCT/CN2018/109753, filed on Oct. 11, 2018, which claims priority to Chinese Patent 201710953233.7, filed on Oct. 13, 2017. The disclosures of the aforementioned applications are hereby incorporated by reference in their entireties.

TECHNICAL FIELD

This application relates to the field of computer operating systems, and in particular, to a method, an apparatus, a system, and the like for ranking importance of applications deployed in an operating system, and performing resource management based on the importance ranking.

BACKGROUND

A primary task of a computer operating system, including a smartphone operating system, is maintaining resource allocation for various applications running in the computer operating system. The computer operating system includes a plurality of types of resources, such as a processor (for example, a central processing unit CPU) computing resource represented in a form of a time slice, a memory resource represented in a form of a memory page, and an input/output (Input/Output, I/O) resource represented in a form of bandwidth. When a resource that supports a current operation of a user cannot be supplied in time, the operating system stalls. Therefore, a core factor that affects whether the operating system stalls is a resource scheduling policy, and a most important condition for determining whether the resource scheduling policy is proper is whether the resource scheduling policy identifies an important application and a non-important application to allocate a resource as properly as possible.

A smartphone operating system Android is used as an example. Applications may be classified into a foreground application, a background application, and an unstarted application. Usually, a user can feel stalling in a process of using the foreground application. Therefore, the foreground application is relatively more important. Therefore, from a perspective of the user, a main reason why the Android system stalls lies in that applications are not sequentially executed, and consequently a resource required when the foreground application or a service is used cannot be ensured. In an existing method, the foreground application and the background application can be identified, and more resources are properly allocated to the foreground application, but such allocation is relatively fixed. However, in a real-time scenario, especially when resources are insufficient, how to temporarily provide more resources for the foreground application or an important application to ensure running of these important applications relates to a problem of how to release some resources occupied by a current non-important application. In a process of resolving this problem, a problem that urgently needs to be resolved is determining an application whose resource is to be released to temporarily facilitate an important application.

SUMMARY

This application provides a resource management method, a terminal device to which the method is applied, and the like. The method includes an application importance ranking method and a resource scheduling method, so as to identify importance of an application in a current scenario, and further schedule a resource accordingly to ensure a resource supply for a more important application, thereby avoiding system stalling to an extent, and improving user experience.

According to a first aspect, this application provides a resource management method. The method may be applied to a computer system, for example, a terminal device. The terminal device obtains data, where the data includes application sequence feature data related to current foreground applications and at least one of the following real-time data: a system time of the computer system, current status data of the computer system, and current location data of the computer system. The terminal device selects, from a plurality of machine learning models based on at least one of the real-time data, a target machine learning model that matches the real-time data, where the plurality of machine learning models herein are corresponding to different application use regularities. The terminal device inputs all the obtained data into the target machine learning model, to rank, by using the target machine learning model, importance of a plurality of applications installed in the computer system. A result of the importance ranking may be used as one of decision factors for the terminal device to perform resource management. The target machine learning model may be alternatively determined by using obtained data other than the real-time data.

A plurality of machine learning models are set, a machine learning model most related to a current scenario of the terminal device is determined from the plurality of machine learning models based on collected data, and application importance ranking is determined based on the machine learning model, so that a result of the application importance ranking more conforms to the current scenario of the terminal device, that is, real-time accuracy of the importance ranking is higher.

In addition, compared with the prior art in which single data or a small amount of data is collected, application ranking provided in this application is based on a plurality of types of collected data related to use of the terminal device, and data diversity can also improve accuracy of the application ranking.

In some embodiments, the application sequence feature data is used to represent data of a time sequence for using a plurality of applications. Specifically, the application sequence feature data may include k1 recently used applications, k2 most possible pre-order applications in the foreground applications, and k3 most possible post-order applications in the foreground applications, where k1, k2, and k3 are all positive integers.

In some embodiments, the terminal device determines, based on the system time of the computer system, a time period in which the computer system is currently located; and determines, from a correspondence based on the time period in which the computer system is currently located, a target machine learning model corresponding to the time period in which the computer system is currently located, where the correspondence includes a plurality of time periods and a plurality of machine learning models respectively corresponding to the plurality of time periods.

In some embodiments, the terminal device determines, based on the current location data of the computer system, a semantic location at which the computer system is currently located; and then determines, from a correspondence based on the semantic location at which the computer system is currently located, a target machine learning model corresponding to the semantic location at which the computer system is currently located, where the correspondence includes a plurality of semantic locations and a plurality of machine learning models respectively corresponding to the plurality of semantic locations.

The foregoing are two manners of determining the target machine learning model. A plurality of target machine learning models are respectively corresponding to a plurality of regularities for using an application by a user. The plurality of use regularities may be classified based on one dimension, for example, the system time or the current location data, or may be classified based on a plurality of dimensions.

In some embodiments, the terminal device determines the target machine learning model based on at least two of the real-time data. Different from the foregoing two implementations, in these embodiments, a use regularity corresponding to the target machine learning model is a result of classification performed based on a plurality of dimensions. For example, use regularities of the user are classified into four types in a time dimension and a geographical location dimension: a working time and a company, a working time and a business trip (not a company), a non-working time and a home, and a non-working time and an entertainment location (not a home). The four types of use regularities respectively present different features, and therefore each are corresponding to one machine learning model. The terminal device determines, based on the real-time data, a machine learning model that most conforms to the current scenario.

A method for measuring a "use regularity" is not limited in this application. That use regularities are different means that different use regularities present different features from a perspective of a current measurement method.

In some embodiments, the terminal device may further predict, based on an application use history, a quantity N of applications frequently used by the user in a current scenario, and then determine, based on the importance ranking, N applications that are ranked at the top. In this way, the terminal device can use the N applications as important applications when performing resource management. In some cases, the terminal device may reserve resources for the N applications, or take some measures to protect the N applications.

Although there is a result of importance ranking for all applications, it is difficult for the terminal device to determine a quantity of to-be-selected applications when selecting some applications during resource management. By predicting the quantity N of applications frequently used by the user, the terminal device can perform resource management more purposefully and clearly. In addition, the N applications are really applications with very high importance, and this makes resource management more proper.

In some embodiments, the terminal device determines N applications (or more or fewer applications) whose importance is ranked at the top, reserves resources for the determined applications, or temporarily freezes another remaining application, or creates a VIP queue for each CPU. The VIP queue includes tasks (processes or threads) of these determined applications, and execution of each task in the VIP queue takes precedence over that of another execution queue of the CPU.

When applications are ranked by using the method provided in this application, historical data about use of the applications needs to be collected. However, for a newly installed application, the application may rank at the bottom because there is an excessively small amount of historical data about use of the application. However, this cannot accurately represent real importance of the newly installed application.

According to a second aspect, this application further provides a method for ranking importance of newly installed applications, and this is equivalent to compensating for importance of the newly installed applications. A terminal device ranks importance of newly installed applications based on weights of the newly installed applications, and selects N2 newly installed applications that are ranked at the top from the newly installed applications, where a time when the newly installed applications are installed in the computer system is less than a preset second threshold. Correspondingly, when performing resource management, the terminal device may also consider the ranking of the newly installed applications. For example, when reserving a resource, if a quantity of applications is limited, the terminal device not only considers some applications that are ranked at the top in the importance ranking result, but also considers a newly installed application that is ranked at the top in a ranking result of the newly installed applications. Another type of resource management is also similar.

This avoids that an application that is relatively important to a user in the newly installed applications is ignored during resource management, and effectiveness of resource management is further improved.

In some embodiments, the terminal device calculates a score of each newly installed application based on a use possibility weight and a time attenuation weight, where importance of a newly installed application with a high score is higher than importance of a newly installed application with a low score. The use possibility weight is used to reflect whether the newly installed application has recently been used, and the time attenuation weight is used to reflect a time difference between a current time and a time when the application is installed.

According to a third aspect, this application further provides a data collection method and a method for training a model based on collected data, and the methods may be used to support application ranking, resource management, and the like provided in another embodiment.

A terminal device collects and stores application data and related data of the computer system, where the application data includes an identifier of the application and a time when the application is used, and the related data of the computer system includes at least one of the following data: a time, status data, and location data that are of the computer system at the time when the application is used.

Further, the terminal device obtains, through calculation, application sequence feature data of a plurality of applications based on the application data collected and stored in a period of time in the past; inputs the application data, or the application data and the related data of the computer system into a classification model, such as an entropy production model, to obtain a plurality of categories related to regularities for using the application, where any two categories are respectively corresponding to two different regularities; and trains a machine learning model for each of the plurality of categories, where the machine learning model is used to rank importance of applications, and input of the training includes at least one of the time when the application is used, the application sequence feature data, and the related data of the computer system.

In some embodiments, a model training process may be performed at a server end. The terminal device sends collected data to a server, and the server trains a model. The server may locally store a trained model, or may return a trained model to the terminal device. If the model is stored on the server side, the terminal device may apply for the model from the server when performing importance ranking. Further, importance ranking may be alternatively performed at the server end, and the terminal device only needs to store a ranking result or apply for a ranking result from the server when using the ranking result.

According to a fourth aspect, this application further provides a resource management method, and the method may be applied to a computer system, for example, a terminal device. When detecting a specific event, the terminal device temporarily freezes some applications until a specific time period ends, and then unfreezes all or some of the frozen applications. The specific event is an event indicating that a required quantity of resources increases, for example, an application start event, a photographing event, a gallery zooming event, a sliding event, and a screen-on/off event.

That the specific time period ends is only one unfreezing condition, and another condition may be that it is detected that the specific event ends.

Further, some emergency events may occur, and these events occur before the specific time period and the specific event end. Once such an emergency event occurs, an application related to the emergency event needs to be unfrozen ahead of schedule.

When a required quantity of instantaneous resources is large, some applications with relatively low importance are temporarily frozen to release some resources, so as to ensure resource supplies for applications that are sensed by a user and that require a relatively large quantity of resources, thereby avoiding stalling for these applications, and improving user experience. Temporary freezing is freezing an application for a relatively short period of time, and then releasing the application. However, in the prior art, an application that is not used for a long period of time is usually frozen for a long period of time, and is then unfrozen when the application is requested. Although the foregoing are both freezing manners, the freezing manners are different in terms of at least a use scenario and a specific freezing manner.

In some embodiments, the terminal device implements temporary freezing by setting a timer, and duration of the timer is set to the specific time period. In this manner, a code change amount is relatively small.

In some embodiments, some of the applications that are temporarily frozen include all background applications or all background applications that cannot be sensed by a user. In some other embodiments, some of the applications that are temporarily frozen include an application with low importance. Importance of an application is obtained based on historical usage of the application, a machine learning algorithm, and current scenario data of a system. Specifically, the importance of the application may be obtained according to the importance ranking method provided above, and an application whose importance is ranked at the bottom is selected to be temporarily frozen.

According to a fifth aspect, this application further provides another resource management method, and the method may be applied to a computer system, for example, a terminal device. The terminal device includes a plurality of physical cores, each physical core is corresponding to one first queue and one second queue, and the first queue and the second queue each include one or more tasks to be executed by the physical core. At least one physical core performs the following method: obtaining and executing a task in the first queue until execution of all tasks in the first queue is completed, and then obtaining and executing a task in the second queue.

The terminal device places important tasks into an additional queue with a higher execution priority, and the physical core first executes these important tasks, to ensure resource supplies for the important tasks.

In some embodiments, the terminal device monitors whether a task whose wait time exceeds a specific threshold exists in the first queue, and if a task whose wait time exceeds the specific threshold exists, the terminal device moves the task to a first queue corresponding to another physical core.

Due to a limitation of a Linux operating system, a real-time task usually cannot be moved from one physical core to another physical core. The important task herein is a non-real-time task. When an important task whose wait time expires is detected, the important task whose wait time expires is moved to an idle first queue of another physical core, so as to avoid stalling caused by an excessively long wait time of the important task.

In some embodiments, the task in the first queue includes an important task (or referred to as a key task) and a task on which the important task depends. The important task is a task that affects user experience, or a task that can be sensed by a user, or a task of an application with high importance. Importance of an application is obtained based on historical usage of the application, a machine learning algorithm, and current scenario data of a system. For example, a dependency relationship between tasks is a data dependency, a lock dependency, or a binder service dependency.

Because execution of an important task depends on execution of a task on which the important task depends, the important task and the task on which the important task depends are both placed into the first queue with a higher execution priority, so as to further increase an execution speed of the important task.

According to a sixth aspect, this application further provides a corresponding apparatus for each method provided in this application, and the apparatus includes a module configured to implement steps of the method. The module may be implemented by software, a combination of software and hardware, or hardware.

According to a seventh aspect, this application further provides a terminal device, including a processor and a memory. The memory is configured to store a computer readable instruction, and the processor is configured to read the computer readable instruction stored in the memory to implement any one or more methods provided in this application.

According to an eighth aspect, this application further provides a storage medium. The storage medium may be specifically a nonvolatile storage medium and is configured to store a computer readable instruction. When one or more processors execute the computer readable instruction, any one or more methods provided in this application are implemented.

According to a ninth aspect, this application further provides a computer program product. The product includes a computer readable instruction. When one or more processors execute the computer readable instruction, any one or more methods provided in this application are implemented.

In some embodiments, a specific degree of importance is not specifically limited in this application, because a person skilled in the art may understand that there are different requirements in different cases. For the ranking method provided in this application, "importance" of an application is a possibility that the application is used by a user, and a larger possibility indicates higher importance. However, in some other embodiments, for example, application resource management and control, "importance" of an application may be determined based on a current resource management and control status, for example, the importance of the application may be related to whether the user senses the application, and so on. In addition, the two resource management methods provided in this application may or may not depend on the ranking method provided in this application.

A key to resolving disordered scheduling of resources in a computer operating system is to ensure that the system can accurately sense importance of an application in real time, and implement an optimal resource management policy based on application importance ranking, so as to ensure that the system resources are fully used. In short, the operating system needs to fully identify a use requirement of the user from a perspective of the user, and supply a resource according to the requirement. For example, the operating system needs to fully ensure a resource for an application currently used by the user, prepare a resource for an application to be used by the user, and fully recycle a resource for an application that is currently least concerned by the user, such as an application started through ineffective self-start or associated start.

According to the application ranking method provided in this application, a plurality of types of information of a computer device (for example, an intelligent terminal) are collected in real time, and a plurality of machine learning models in different categories related to application use regularities are separately trained. During importance ranking, a machine learning model that most conforms to a use regularity of a user is selected to predict importance of an application in real time, thereby improving identification accuracy of application importance.

Further, resource management is properly and effectively performed based on identification of application importance, so that a resource supply for an important application is ensured, and fluency of using the computer device is improved, thereby improving use experience of the user.

BRIEF DESCRIPTION OF DRAWINGS

To describe technical solutions provided in this application more clearly, the following briefly describes the accompanying drawings. Apparently, the accompanying drawings in the following description show merely some embodiments of this application.

DESCRIPTION OF EMBODIMENTS

Figure 1:
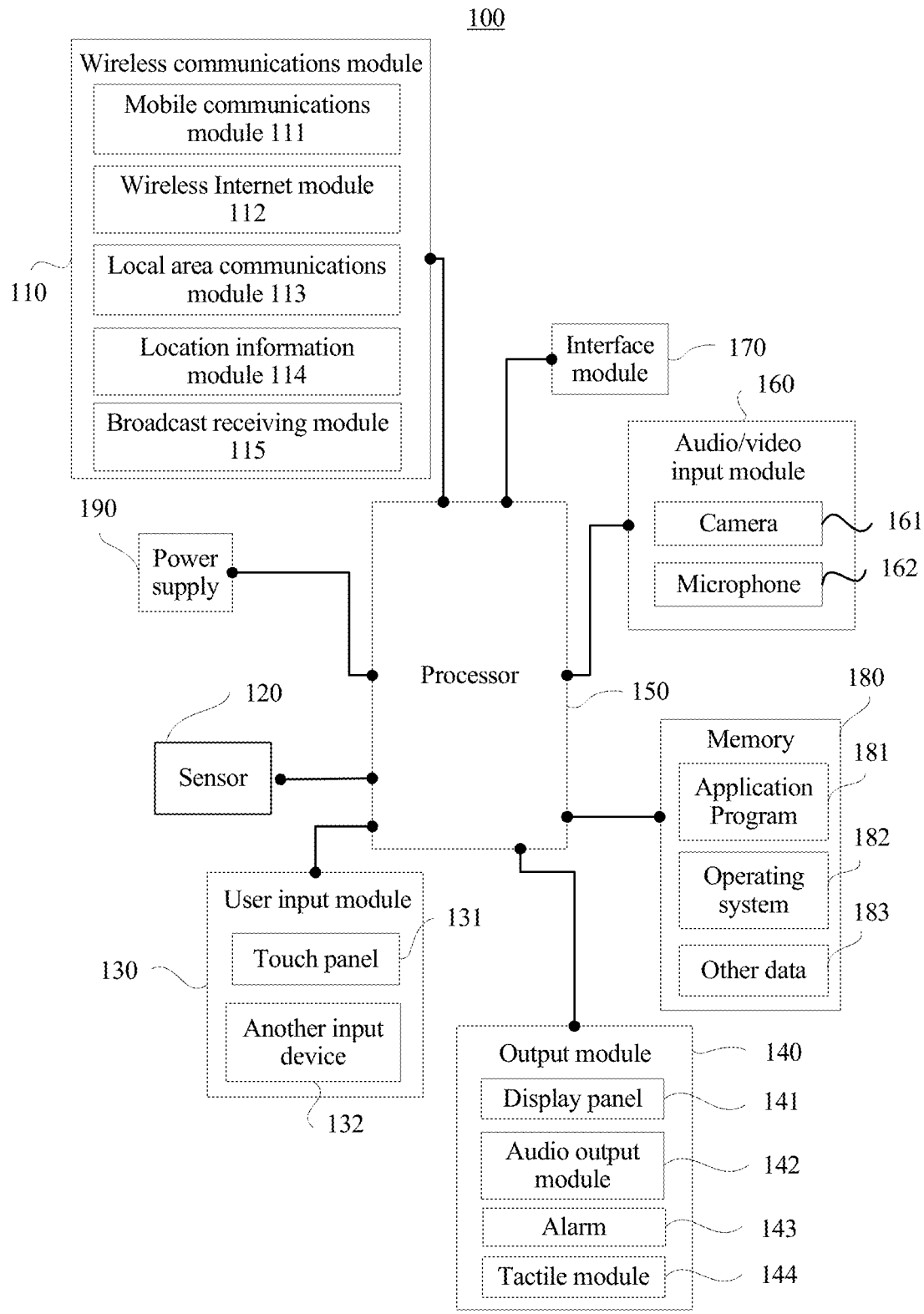
FIG. 1 is a schematic diagram of a logical structure of a terminal device.

To help understand the embodiments of this application, several elements used in description of the embodiments of this application are first described herein.

Operating system: An operating system is a computer program that manages computer hardware and software resources, and is also a kernel and a cornerstone of a computer system. The operating system needs to handle basic transactions, for example, managing and configuring memory, determining a priority of a system resource supply and demand, controlling input and output devices, operating a network, and managing a file system. The operating system also provides an operation interface for a user to interact with the system. The operating system has quite diverse forms. Operating systems installed on different machines may be simple or complex, and may be an embedded system in a mobile phone or a large operating system of a supercomputer. Many operating system manufacturers have different definitions for a scope of the operating system. For example, some operating systems integrate a graphical user interface (graphic user interface, GUI), but some operating systems each use only a command-line interface, and consider the GUI as a non-essential application program. It is usually considered that a terminal operating system is an operating system running on a terminal such as a mobile phone, a tablet computer, or a point of sale, for example, current mainstream Android or iOS.

Application: An application is also referred to as application software or an application program, and is a computer program designed to implement a group of associated functions, tasks, or activities for a user. The application is deployed in an operating system. Specifically, the application may be bound to system software (for example, the operating system) of the operating system for deployment, for example, a system-level application (or referred to as a system service); or may be independently deployed, for example, a currently common text processing application (for example, a Word application), a web browser application, a multimedia play application, or a game application.

System resource: A system resource in this application is a resource in a computer system, and includes but is not limited to any one or more of a memory resource, a processing resource, and an I/O resource. A resource is managed in many implementations. For example, a resource is recycled by terminating, freezing, or compressing some applications, a resource is retained by refusing to start an application, or a resource is reserved for an application by preloading the application.

Foreground application, background application, and foreground-background switching of an application: A foreground application is short for an application running in a foreground. A background application is short for an application running in a background. For example, a Word application and a web browser application are currently started, but a user currently writes some operating systems to separately manage the two applications by using two lists. In a Linux system, when an application is switched from the foreground to the background or from the background to the foreground, a foreground-background switching event is triggered. The system can sense foreground-background switching of the application by monitoring the foreground-background switching event. In some embodiments, background applications are further classified into an insensible background application and a sensible background application. The sensible background application means that some applications can still be sensed by a user even if the applications run in the background, for example, a music play application or a navigation application. The user can still hear music or navigation sound even if the two applications run in the background.

Pre-order application and post-order application: A pre-order application of an application is an application used before the application is used (which may be understood as before the application is switched to a foreground), and a post-order application of an application is an application used after the application is used. That an application is used means that the application is started or the application is switched from the background to the foreground, and that the application is started may also be understood as that the application is switched to the foreground (from termination).

Application sequence feature data: Application sequence feature data is data used to represent a time sequence for using a plurality of applications, for example, which application has recently been used, which application may be a pre-order application of an application, or which application may be a post-order application of an application.

System status data: System status data is also referred to as status data for short, and is used to indicate information about a status of a computer device or an operating system. More specifically, the system status data may be understood as status data of a built-in component or an external component of a device, for example, a network connection status, or a connection status of an external device such as a headset or a charging cable.

Location data and semantic location data: Location data is a concept in a broad sense, and any information indicating a location may be considered as the location data, for example, a longitude and a latitude. When practical meanings are given to relatively precise location data such as a longitude and a latitude, for example, "home", "company", and "entertainment place", the location data is semantic location data. The semantic location data is also a type of the location data.

The location data and the system status data may also be collectively understood as scenario data of a device.

Application importance: Application importance is a probability of using an application, or is understood as a possibility of switching an application to a foreground. In this application, ranking of application importance is ranking of probabilities of using applications. A basis of such ranking is a prediction that is of a probability of using an application and that is based on a use history of the application and some other information.

Unless otherwise specified, "a plurality of" in this application means two or more than two. A storage manner or format of "data" or "information" mentioned in this application is not limited.

A method provided in this application is mainly applied to a terminal device, and the terminal device (which is usually a mobile terminal) may also be referred to as user equipment (user equipment, UE), a mobile station (mobile station, MS), a mobile terminal (mobile terminal), and the like. Optionally, the terminal may be capable of communicating with one or more core networks through a radio access network (radio access network, RAN). For example, the terminal may be a mobile phone (or referred to as a "cellular" phone) or a computer having a mobility property. For example, the terminal may also be a portable, pocket-sized, handheld, computer built-in, or in-vehicle mobile apparatus. For example, the terminal device may be a cellular phone, a smartphone, a laptop computer, a digital broadcast terminal, a personal digital assistant, a portable multimedia player, or a navigation system. It should be understood that in addition to the mobile terminal, a method provided in any embodiment of this application may also be applied to a fixed terminal, such as a personal computer, a point of sale (point of sale, POS), or an automatic teller machine; or may be applied to a computer system of a non-terminal type, such as a server.

The terminal device in this application is described in more detail with reference to the accompanying drawings. It should be noted that post-words "unit" and "module" are merely intended for convenience of description, and these post-words do not have meanings or functions distinguished from each other.

FIG. 1 is a schematic structural diagram of a terminal device according to an embodiment. As shown in FIG. 1, the terminal device 100 includes a wireless communications module 110, a sensor 120, a user input module 130, an output module 140, a processor 150, an audio/video input module 160, an interface module 170, a memory 180, and a power supply 190.

The wireless communications module 110 may include at least one module that can implement wireless communication between the terminal device 100 and a wireless communications system or between the terminal device 100 and a network in which the terminal device 100 is located. For example, the wireless communications module 110 may include a broadcast receiving module 115, a mobile communications module 111, a wireless Internet module 112, a local area communications module 113, and a location (or positioning) information module 114.

The broadcast receiving module 115 may receive a broadcast signal and/or broadcast-related information from an external broadcast management server through a broadcast channel. The broadcast channel may include a satellite channel and a terrestrial channel. The broadcast management server may be a server that generates and sends a broadcast signal and/or broadcast-related information, or may be a server that receives a pre-generated broadcast signal and/or broadcast-related information and sends the pre-generated broadcast signal and/or broadcast-related information to the terminal device 100. The broadcast signal may include not only a television broadcast signal, a radio broadcast signal, and a data broadcast signal, but also a signal in a form of a combination of a television broadcast signal and a radio broadcast signal. The broadcast-related information may be information about a broadcast channel, a broadcast program, or a broadcast service provider, or even may be provided by using a mobile communications network. When the broadcast-related information is provided by using a mobile communications network, the broadcast-related information may be received by the mobile communications module 111. The broadcast-related information may exist in various forms. For example, the broadcast-related information may exist in a form of an electronic program guide (electronic program guide, EPG) of a digital multimedia broadcasting (digital multimedia broadcasting, DMB) system, or in a form of an electronic service guide (electronic service guide, ESG) of a digital video broadcasting-handheld (digital video broadcast-handheld, DVB-H) system. The broadcast receiving module 115 may receive a broadcast signal by using various broadcasting systems. More specifically, the broadcast receiving module 115 may receive a broadcast signal by using a digital broadcasting system such as digital multimedia broadcasting-terrestrial (multimedia broadcasting-terrestrial, DMB-T), digital multimedia broadcasting-satellite (digital multimedia broadcasting-satellite, DMB-S), media forward link only (media forward link only, MediaFLO), DVB-H, and integrated services digital broadcasting-terrestrial (integrated services digital broadcasting-terrestrial, ISDB-T). In addition to the foregoing digital broadcasting systems, the broadcast receiving module 115 may receive a signal from a broadcasting system that provides a broadcast signal. The broadcast signal and/or the broadcast-related information received by the broadcast receiving module 115 may be stored in the memory 180.

The mobile communications module 111 may send a radio signal to at least one of a base station, an external terminal, and a server in a mobile communications network, or may receive a radio signal from at least one of the base station, the external terminal, and the server. Based on receiving and sending of a text/multimedia message, the signal may include a voice call signal, a videotelephony call signal, and data in various formats.

The wireless Internet module 112 may be corresponding to a module used for wireless access, and may be included in the terminal device 100 or may be externally connected to the terminal device 100. A wireless LAN (WLAN or Wi-Fi), Worldwide Interoperability for Microwave Access (world interoperability for microwave access, WiMAX), high speed downlink packet access (high speed downlink packet access, HSDPA), and the like may be used as wireless Internet technologies.

The local area communications module 113 may be corresponding to a module used for local area communication. In addition, Bluetooth (Bluetooth), radio frequency identification (radio frequency identification, RFID), the Infrared Data Association (infrared data association, IrDA), ultra-wideband (ultra wide band, UWB), and/or ZigBee may be used as local area communications technologies.

The location information module 114 may determine or obtain a location of the mobile terminal 100. The location information module 114 may obtain location information by using a global navigation satellite system (global navigation satellite system, GNSS). The GNSS is a radio navigation satellite system that rotates around the earth and sends reference signals to radio navigation receivers of a predetermined type, so that the radio navigation receivers can determine locations of the radio navigation receivers on or near the earth's surface. The GNSS may include the global positioning system (global positioning system, GPS) of the United States, the Galileo system of Europe, the global orbit navigation satellite system of Russia, the compass system of China, the quasi-zenith satellite system of Japan, and the like.

A GPS module is a representative example of the location information module 114. The GPS module 114 may obtain, through calculation, information about a distance between one point or object and at least three satellites and information about a time when the distance information is obtained through measurement, and may apply a triangulation method to the obtained distance information to obtain three-dimensional location information about the point or the object at a predetermined time based on a longitude, a latitude, and a height. Alternatively, the GPS module 114 may obtain, through calculation, location and time information by using three satellites, and correct, by using another satellite, the location and time information obtained through calculation. In addition, the GPS module 114 may continuously calculate a current location in real time, and calculate speed information by using positioning or location information.

The sensor 120 may sense a current status of the terminal device 100, such as an open/closed state of the terminal device 100, and sense a location of the terminal device 100, whether a user is in contact with the terminal device 100, a direction of the terminal device 100, and acceleration/deceleration of the terminal device 100. In addition, the sensor 120 may generate a sensing signal used to control an operation of the terminal device 100. For example, in a case of a slide phone, the sensor 120 may sense whether the slide phone is open or closed. In addition, the sensor 120 may sense whether the power supply 190 supplies power and/or whether the interface unit 170 is connected to an external apparatus. The sensor 120 may specifically include a posture detection sensor, a proximity sensor, and the like.

The user input module 130 is configured to: receive digital information, character information, or a contact touch operation/non-contact gesture that is input, and receive signal input related to user settings and function control of the terminal device 100, and the like. A touch panel 131, also referred to as a touchscreen, may collect a touch operation performed by a user on or near the touch panel 131 (for example, an operation performed by the user on the touch panel 131 or near the touch panel 131 by using any proper object or accessory such as a finger or a stylus), and drive a corresponding connection apparatus based on a preset program. Optionally, the touch panel 131 may include two parts: a touch detection apparatus and a touch controller. The touch detection apparatus detects a touch orientation of the user, detects a signal resulting from a touch operation, and transfers the signal to the touch controller. The touch controller receives touch information from the touch detection apparatus, converts the touch information into contact coordinates, and then sends the contact coordinates to the processor 150. In addition, the touch controller can receive and execute a command sent by the processor 150. For example, the user taps an icon of an application on the touch panel 131 with a finger. The touch detection apparatus detects a signal resulting from the tapping, and then transfers the signal to the touch controller. The touch controller then converts the signal into coordinates, and sends the coordinates to the processor 150. The processor 150 starts the application based on the coordinates and a type of the signal (single tapping or double tapping).

The touch panel 131 may be implemented by using a plurality of types such as a resistive type, a capacitive type, an infrared type, and a surface acoustic wave type. In addition to the touch panel 131, the input device 130 may further include another input device 132. The another input device 132 may include but is not limited to one or more of a physical keyboard, a function key (for example, a volume control key or an on/off key), a trackball, a mouse, a joystick, a membrane switch (dome switch), a scroll wheel (jog wheel), and a jog switch (jog switch).

The output module 140 includes a display panel 141, configured to display information entered by a user, information provided for a user, various menu interfaces of the terminal device 100, or the like. Optionally, the display panel 141 may be configured in a form of a liquid crystal display (liquid crystal display, LCD), an organic light-emitting diode (organic light-emitting diode, OLED), or the like. In some other embodiments, the touch panel 131 may cover the display panel 141 to form a touch display screen.

In addition, the output module 140 may further include an audio output module 142, an alarm 143, a tactile module 144, and the like.

The audio output module 142 may output, in a call signal receiving mode, a phone call mode, a recording mode, a speech recognition mode, and a broadcast receiving mode, audio data received from the wireless communications module 110 or audio data stored in the memory 180. The audio output module 142 may output an audio signal, such as a call signal received tone or a message received tone, related to a function performed in the terminal device 100. The audio output module 142 may include a receiver, a speaker, a buzzer, and the like. The audio output module 142 may output sound through a headset jack. The user can listen to the sound by connecting a headset to the headset jack.

The alarm 143 may output a signal used to indicate occurrence of an event of the terminal device 100. For example, the alarm 143 may generate an alarm when receiving a call signal, a message, an input key signal, or an input touch. The alarm 143 may further output a signal in a form different from a video signal or a frequency signal, for example, a signal indicating occurrence of an event through a vibration.

The tactile module 144 may generate various tactile effects that can be sensed by the user. A vibration is an example of a tactile effect. Strength and/or a mode of a vibration generated by the tactile module 144 may be further controlled. For example, different vibrations may be output in combination or sequentially. The tactile module 144 may generate a plurality of tactile effects. In addition to the vibration, the tactile effects may further be one or more of the following plurality of effects: a stimulus effect of a needle array vertically moving relative to a skin surface, an air spray effect or an air suction effect formed by using a spray hole or a suction hole, a skin-friction stimulus effect, an electrode-contact stimulus effect, a stimulus effect of using electrostatic force, a hot or cold effect that can be reproduced by using an element that can absorb heat or release heat, and the like. The tactile module 144 may not only send the tactile effects through direct contact, but also allow the user to feel the tactile effects by using a muscle sense of a finger or an arm of the user. The terminal device 100 may include a plurality of tactile modules 144.

The processor 150 may include one or more processors, for example, the processor 150 may include one or more central processing units, or include one central processing unit and one graphics processing unit. When the processor 150 includes a plurality of processors, the plurality of processors may be integrated on a same chip, or each of the plurality of processors may be an independent chip. One processor may include one or more physical cores, and the physical core is a minimum processing module.

The audio/video input module 160 is configured to input an audio signal or a video signal. The audio/video input module 160 may include a camera 161 and a microphone 162. The camera 161 may process an image frame that is of a still image or a moving image and that is obtained by an image sensor in a videotelephony mode or a photographing mode. A processed image frame may be displayed on the display panel 141.

An image frame processed by the camera 161 may be stored in the memory 180 or may be sent to an external device by using the wireless communications module 110. The terminal device 100 may further include a plurality of cameras 161.

The microphone 162 may receive an external audio signal in a call mode, a recording mode, or a speech recognition mode, and process the received audio signal into electronic audio data. The audio data may be then converted into a form that can be sent to a mobile communications base station by using the mobile communications module 111, and is output in a call mode. The microphone 162 may use various noise cancellation algorithms (or noise cancellation algorithms) to cancel or reduce noise generated when an external audio signal is received.

The interface module 170 may be used as a path of an external device connected to the terminal device 100. The interface module 170 may receive data or power from the external device and send the data or the power to an internal component of the terminal device 100, or send data of the terminal device 100 to the external device. For example, the interface module 170 may include a wired/wireless head-mounted headset port, an external charger port, a wired/wireless data port, a memory card port, a port used to connect devices having a subscriber identity module, an audio I/O port, a video I/O port, and/or a headset port.

The interface module 170 may be further connected to a subscriber identity module, and the subscriber identity module is a chip that stores information used to verify a right of using the terminal device 100. An identification device including the subscriber identity module may be manufactured into a form of a smart card. Therefore, the identification device may be connected to the terminal device 100 by using the interface module 170.

The interface module 170 may further be a path used to provide power from an external tray for the terminal device 100 when the terminal device 100 is connected to the external tray, or a path used to send, to the terminal device 100, various command signals input by the user by using a tray. The various command signals that are or the power that is input from the tray may be used as signals for confirming whether the terminal device 100 is correctly installed in the tray.

The memory 180 stores a computer program, and the computer program includes an operating system program 182, an application program 181, and the like. For example, a typical operating system is a system used for a desktop computer or a notebook computer, such as Windows of Microsoft or MacOS of Apple; or a system used for a mobile terminal, such as a Linux-based Android (Android) system developed by Google. The processor 150 is configured to read the computer program from the memory 180, and then perform a method defined by the computer program. For example, the processor 150 reads the operating system program 182 to run the operating system on the terminal device 100 and implement various functions of the operating system; or reads one or more application programs 181 to run the application on the terminal device.

The operating system program 182 includes a computer program that can implement the method provided in any embodiment of this application, so that after the processor 150 reads the operating system program 182 and runs the operating system, the operating system may have a real-time application ranking function and/or a resource management function provided in this application.

The memory 180 further stores other data 183 different from the computer program, for example, information such as application information obtained through collection in this application, a model obtained through training, and a result of real-time ranking. For another example, the memory 180 temporarily stores input/output data (for example, phone book data, a message, a static image, and/or a moving image), and data related to various modes of vibrations and sound that are output when touch input is applied to the touchscreen.

The memory 180 may be one or more of the following types: a flash (flash) memory, a hard disk-type memory, a micro multimedia card memory, a card memory (for example, an SD memory or XD memory), a random access memory (random access memory, RAM), a static random access memory (static RAM, SRAM), a read-only memory (read only memory, ROM), an electrically erasable programmable read-only memory (electrically erasable programmable read-only memory, EEPROM), a programmable read-only memory (programmable ROM, PROM), a magnetic memory, a magnetic disk, or an optical disc.

In some other embodiments, the memory 180 may be alternatively a network storage device on the Internet, and the terminal device 100 may perform an update operation, a read operation, or the like on the memory 180 on the Internet.

The power supply 190 may receive external power and internal power under control of the processor 150, and provide power required for an operation of each component of the terminal device 100.

A connection relationship between modules is only an example. The method provided in any embodiment of this application may also be applied to a terminal device in another connection manner, for example, all modules are connected by using a bus.

The method provided in this application may be implemented by using hardware or software. In a hardware implementation, at least one of electronic units such as an application-specific integrated circuit (application specific integrated circuit, ASIC), a digital signal processor (digital signal processor, DSP), a programmable logic device (programmable logic device, PLD), a field programmable gate array (field programmable gate array, FPGA), a processor, a controller, a microcontroller, and/or a microprocessor may be used to implement the implementation of this application. In a software implementation, an implementation of a process, a function, or the like may be implemented by using a software module that performs at least one function and operation. The software module may be implemented by a software program written in any proper software language. The software program may be stored in the memory 180, and the processor 150 reads and executes the software program.

Figure 2:
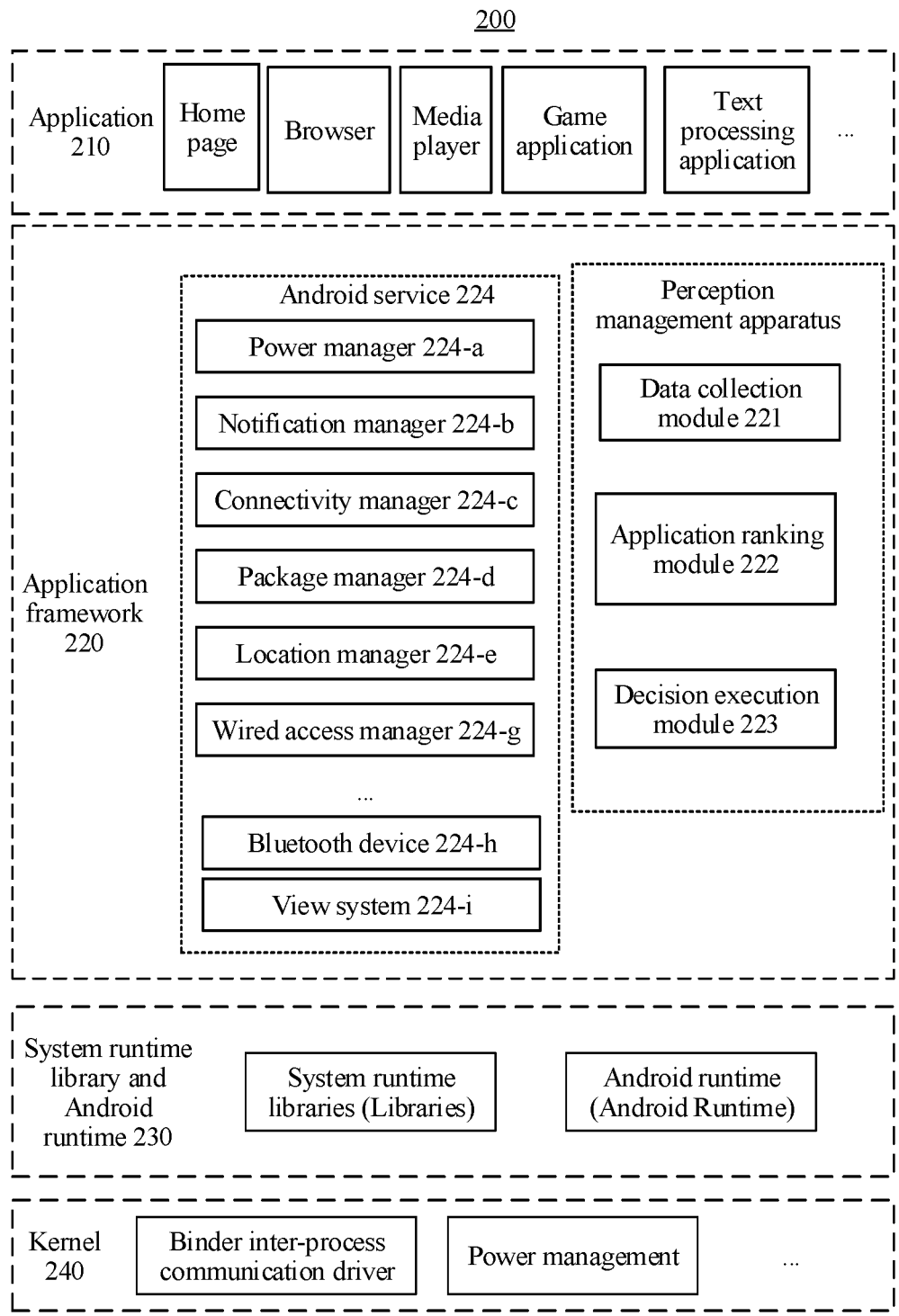
FIG. 2 is a schematic diagram of a logical structure of an operating system deployed on a terminal device.

An implementation of the method provided in this application is described in FIG. 2 by using an Android (Android) system as an example. As shown in the figure, a typical Android system 200 includes an application 210, an application framework 220, a system runtime library and Android runtime 230, and a kernel 240. Android is developed based on Linux, and therefore the kernel 240 is a Linux kernel.

The application 210 includes various applications such as a browser, a media player, a game application, and a text processing application. Some applications are inherent applications of the system, and some applications are installed by a user according to a requirement. This application focuses on statuses of using these applications by the user, so as to ensure a resource supply for an application that is most likely to be used by the user, and avoid stalling in an application from a perspective of the user.

The application framework 220 includes an Android service 224, and the Android service includes a plurality of system services provided by the Android system for use by another module, for example, a power manager 224-a, a notification manager 224-b, a connectivity manager 224-c, a package manager 224-d, a location manager 224-e, a wired access manager 224-g, a Bluetooth device 224-h, and a view system 224-i. For implementation of all the managers, refer to modules provided by an Android system in the prior art, and details are not described in this application.

The system runtime library and Android runtime 230 includes a system runtime library 231 and Android runtime 232. The system runtime library 231 is also referred to as a program library, and includes some C/C++ libraries, and these libraries can be used by different components in the Android system.

The Android runtime 232 includes a core library and a Dalvik virtual machine. The core library provides most functions of a Java programming language core library. Each Android application program runs in a process of the Android application program and has an independent Dalvik virtual machine instance. Dalvik is designed to be a device that can efficiently run a plurality of virtual systems at the same time. The Dalvik virtual machine depends on some functions of the Linux kernel 240, such as a thread mechanism and an underlying memory management mechanism.

Core system services of Android, such as security, memory management, process management, a network protocol stack, and various driving models, depend on the Linux kernel 240. The Linux kernel 240 is also used as an abstract layer between hardware and software. In addition, Android further partially modifies the Linux kernel, and the modification mainly relates to two parts:

Binder (IPC) driver: The binder (IPC) driver provides effective inter-process communication. Although the Linux kernel has already provided the function, many services of the Android system need to use this function. For a specific reason, the Android system implements an inter-process communication mechanism.

Power management: This is mainly used to save power. Because the Android system is designed for a mobile terminal, for example, a smartphone, low power consumption is an important purpose.

The Android system is stored in the memory 180 in a form of software code, and the processor 150 reads and executes the software code to implement, on the terminal device 100, functions provided by the system, including the functions provided in this embodiment.

An improvement in this embodiment is mainly in the application framework 220. As shown in the figure, in addition to an original Android system service, the application framework 220 in this embodiment further includes a perception management apparatus. The perception management apparatus includes a data collection module 221, an application ranking module 222, and a decision execution module 223.

It should be understood that the perception management apparatus may also be provided as an Android system service for use by another component. The modules 221 to 223 may be respectively used as three system services, or may be properly combined or subdivided.

The data collection module 221 collects scenario data of the terminal device 100. The scenario data includes location data (for example, GPS location data) of the device, status data of a built-in component or an external component of the device, and the like. For example, the status data may be a display panel layout status, a network connection status, a connection status of a headset or a charging cable, a status of a camera, an audio/video component, or a sensor, or the like. A plurality of components of the terminal device 100 may be understood with reference to FIG. 1. The "component" herein includes both hardware and software.

The data collection module 221 further collects application data related to use of an application, for example, a type of the application, a name of the application, and a time when the application is used. The collected data is directly stored in the memory 180 or sent to another module, or is stored in the memory 180 or sent to another module after being processed.

The application ranking module 222 determines an importance ranking result of all applications in a real-time scenario based on a machine learning model and data collected in real time by the data collection module 221. Before real-time importance ranking is implemented, the application ranking module 222 further performs training based on historical data collected by the data collection module 221 to obtain the foregoing machine learning model.

The decision execution module 223 makes, based on real-time application importance ranking output by the application ranking module 222, a decision on how to manage a system resource, and directly executes or invokes another module to perform a corresponding resource management measure. It should be understood that in specific implementation, the decision execution module 223 does not necessarily require real-time application importance ranking when making all resource management decisions.

It should be noted that when the foregoing modules need to store intermediate data or final data, storage functions are required. These storage functions may be implemented by an independent storage module, or may be separately implemented by being merged in the three modules.

In some other embodiments, the modules 221 to 223 may be implemented in the system runtime library and Android runtime 230 or the kernel 240; or some of the modules may be implemented in the application framework 220, and some of the modules may be implemented at another layer.

Figure 3:
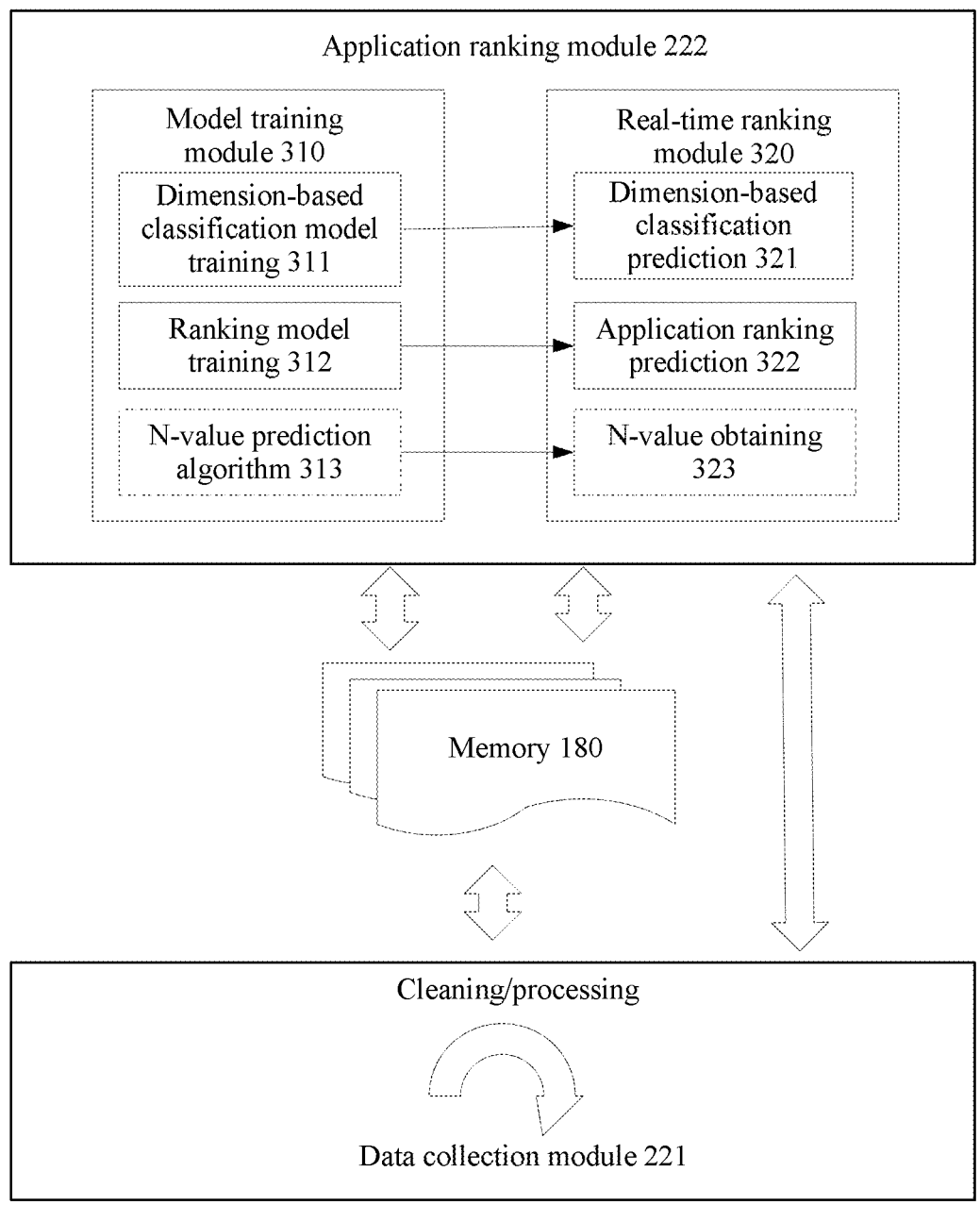
FIG. 3 is a schematic diagram of a logical structure of some modules of a perception management apparatus.

As shown in FIG. 3, the application ranking module 222 includes two submodules: a model training module 310 and a real-time ranking module 320.

The model training module 310 trains, based on historical data collected by the data collection module 221, a model applied to real-time application ranking, and stores the model in the memory 180 for invoking by the real-time ranking module 320 when the real-time ranking module 320 performs real-time application ranking. Specifically, the model training module 310 mainly trains three models: a dimension-based classification model, a ranking model, and an N-value prediction model. The "model" in this application is a concept in a broad sense, and a parameter, a formula, an algorithm, a correspondence, or the like may be considered as a model.

The dimension-based classification model is used to classify application use regularities, and the classification may be one-dimensional classification or multi-dimensional classification. A "dimension", such as time or space, is a basis for use regularity classification. The time is used as an example, and 24 hours of a day is used as a classification basis to classify the application use regularities into two categories: a working time period and a non-working time period. Specifically, whether a terminal currently belongs to the working time period or the non-working time period is determined based on a current system time and the dimension-based classification model obtained through training. Herein, this actually reflects whether a user is currently in a working state or a non-working state. In these two states, the user presents different features in a regularity for using an application. Further, the dimension may be multi-dimensional, for example, a time dimension and a location dimension. For example, the working time period is further classified into "working at a company" or "working on a business trip", and the non-working time period is further classified into "home", "travelling", and the like. For ease of understanding, a semantic description is used in the example herein, for example, "working" and "travelling". It should be understood that this is not limited in specific implementation.

The N-value prediction model is used to determine a quantity of applications frequently used by a user in a specific classification. The value of N is a positive integer. For example, classification is performed based on a time dimension. The value of N reflects a quantity of applications frequently used by the user in a specific time period.

The real-time ranking module 320 is a real-time processing module, and can determine real-time application importance ranking based on data collected by the data collection module 221 in real time and a model trained by the model training module 310. The real-time ranking module 320 performs three functions by using a function provided by the model training module 310: dimension-based classification prediction 321, application ranking prediction 322, and N-value obtaining 323.

It should be understood that each function in each of the model training module 310 and the real-time ranking module 320 may be considered as a function module or unit.

As shown in FIG. 3, the data collection module 221 may perform processing such as cleaning/processing on all or some of collected data, and then store processed data in the memory 180 or provide processed data for the real-time ranking module 320.

It should be noted that not all of the foregoing modules or functions need to be applied to all embodiments. In some embodiments of this application, only some functions may be selected for implementation.

An application ranking method and a resource management method provided in the embodiments are described below, that is, specific implementation of the foregoing modules or units is described.

Figure 4:
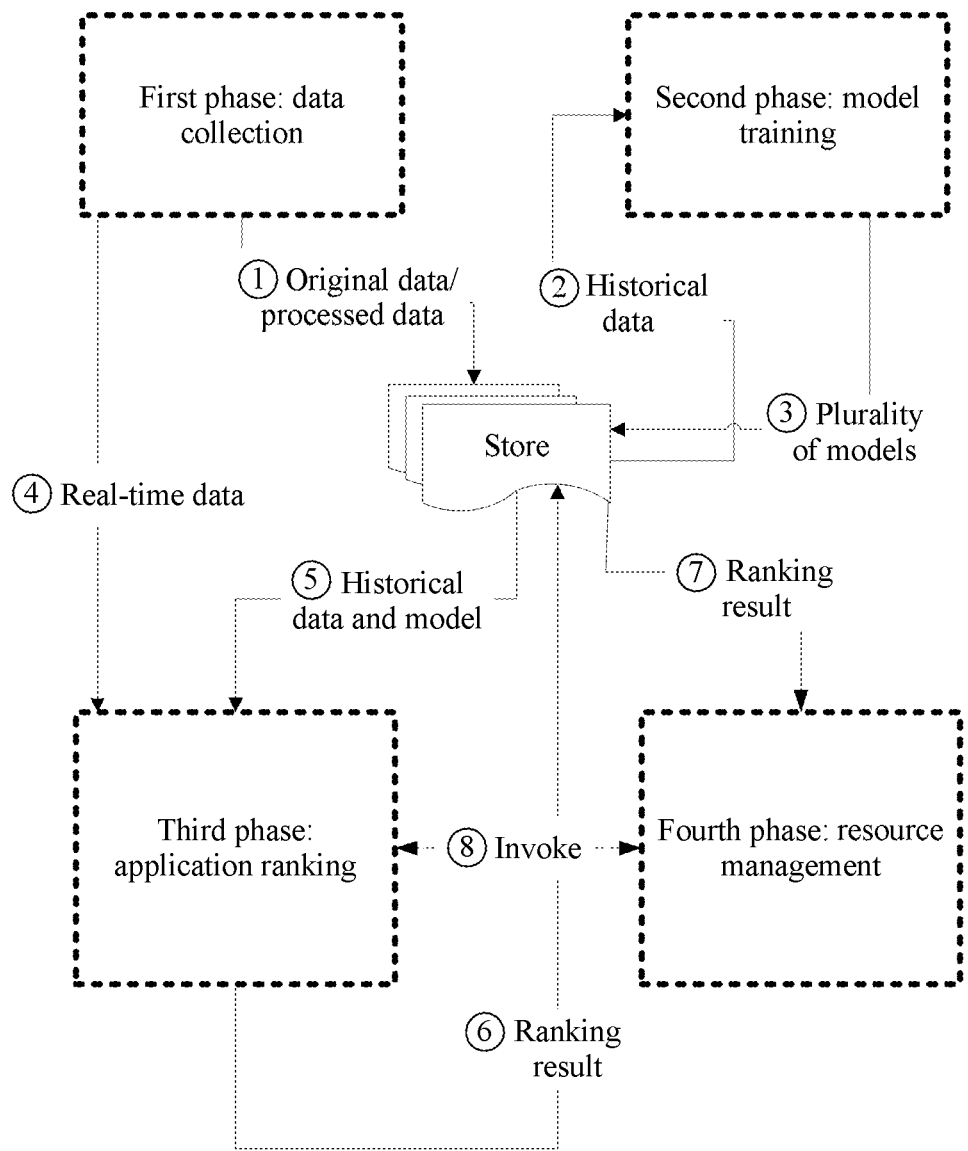
FIG. 4 is a general schematic diagram of a resource management method.

FIG. 4 is a schematic diagram of a global solution of an application ranking method and a resource management method according to an embodiment. The figure shows four main method procedures, including data collection in a first phase, model training in a second phase, application ranking in a third phase, and resource management in a fourth phase. In a description process, to provide a global overview of the solution, the solution is described in the foregoing sequence. However, it should be understood that in specific implementation of the solution, not all of the four phases are performed in series.

After the terminal device runs, the terminal device first performs the first phase, that is, the data collection process, and mainly collects information such as data about application use of a user, and system status data and location data of the terminal device. The information may reflect a regularity for using the application by the user, and the regularity is used to predict a probability of using the application by the user in the future. Some of the collected data is directly stored, and some of the collected data may need to be processed before being stored (①). The first phase is performed by the data collection module 221.

After data collection is performed for a period of time, model training in the second phase is performed. In this application, a machine learning training method is used for model ranking. A specific amount of historical data (②)

usually needs to be input. However, a time specifically required to perform collection before first training is started is not limited in this application. A machine learning model training process is a model establishment process, and is essentially a parameter learning and optimization process. Training a model is learning and updating a model parameter. A trained machine learning model or model parameter is stored for use in ranking in the third phase.

Before a ranking model is trained, collected historical data is classified into a plurality of categories in one or more dimensions based on a machine learning algorithm or another algorithm. Regularities for using an application in the plurality of categories present different features, and respective ranking models are separately trained for the plurality of categories. Therefore, important output in the second phase is a plurality of categories and a plurality of machine learning models (or model parameters) (③) respectively corresponding to the plurality of categories. The second phase is performed by the model training module 310. Further, the model training module 310 calculates, based on an N-value prediction algorithm, a quantity NB of applications frequently used by a user in a specific category, and stores the quantity for subsequent resource management. An N-value prediction process may also be placed in the third phase or the fourth phase.

The terminal device may periodically start the training process, or start the training process at a specified time point, or start the training process according to a principle that collected data is not matched if the data is simple, and so on.

After model training in the second phase is completed, application ranking in the third phase may be performed. In the third phase, applications are ranked based on real-time data (④) and the machine learning model (⑤) that is output in the second phase. In addition to the two items, some historical data (⑤) is also needed for assistance. The real-time data includes one or more of a current application collected in real time, a use time of the current application, a current time (that is, a current system time) of the terminal device, current status data of the terminal device, current location data of the terminal device, and the like. Some data, such as a time sequence for using a plurality of applications, further needs to be obtained through calculation by using use times that are of the plurality of applications and that are recorded in historical data. The third phase is performed by the real-time ranking module 320, and output is a ranking result (⑥) of all applications installed on the terminal device.

Application ranking in the third phase may be periodically started, or may be event-triggered. A trigger event may be application switching, application installation, application uninstallation, a status change of the terminal device, or the like. All of the trigger events may cause an application importance change for a user. In this case, a ranking result may be stored for use when the ranking result is needed for resource management in the fourth phase. In addition, the trigger event may also be a request event triggered by resource management in the fourth phase, that is, application ranking is performed under invoking by resource management.

During resource management in the fourth phase, a latest ranking result (⑦) stored in the memory may be accessed and used, or a ranking result may be obtained by invoking (⑧) application ranking in the third phase in real time according to a requirement. Then a resource is managed based on application importance ranking.

Detailed implementations of the four phases are separately described below by using examples.

Figure 5:
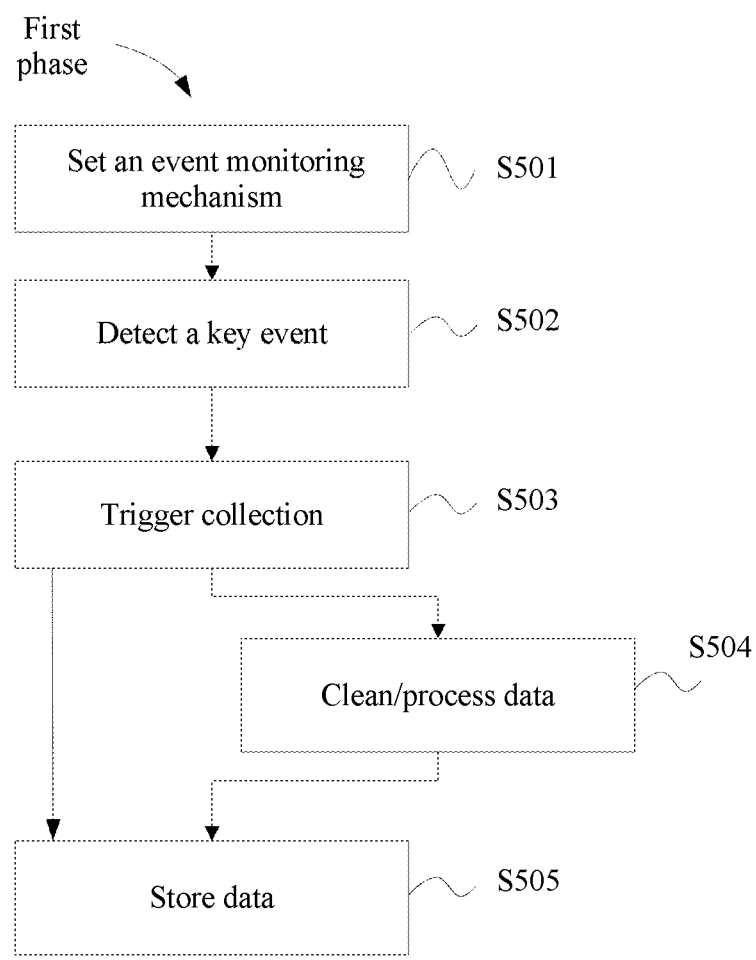
FIG. 5 is a schematic flowchart of a data collection method in a resource management method.

FIG. 5 is a schematic diagram of the data collection process in the first phase. The data collection module 221 first sets an event monitoring mechanism (S501) to monitor whether a key event occurs. If a key event is detected (S502), the data collection process is triggered (S503). Collected data may be directly stored (S505), or may be cleaned/processed (S504) before being stored.

Data cleaning (Data cleaning) is a process in which a computer re-checks and re-verifies data, so as to delete repeated information, correct an existing error, and provide data consistency. Data processing means that the computer changes a type, a format, and the like of data, or performs processing such as mathematical transformation on data.

In an aspect, the data collection module 221 collects scenario data of the terminal device 100 and historical application data related to application use, cleans/processes the collected data and then stores cleaned/processed data in the memory 180, and provides the cleaned/processed data as historical data for the model training module 310 to generate various models through training. Specifically, the data collection module 221 monitors a status of the terminal device, an application use status, and the like in real time; and collects and stores data when a condition is met. For example, the data collection module 221 monitors and buffers, in real time, a change in a user behavior status (which may also be understood as a behavior status of the terminal device, for example, a moving state or a static state), an application use status, a system status, and a location status. After application foreground-background switching or another type of key event occurs, information such as a package name of an application switched to a foreground, a current time, and latest data of the foregoing statuses are recorded in a persistent storage medium.

In another aspect, the data collection module 221 further collects data in real time when ranking is required. The collected data is used as real-time data and becomes input of the real-time ranking module 320, so that the real-time ranking module 320 ranks applications in real time.

For example, the data collected by the data collection module 221 and a collection manner are shown in the following table. It should be understood that in some embodiments, some data may be correspondingly reduced or added according to a requirement. This embodiment is merely an example, and is not intended to be limited to data in this table.

TABLE 1

| Data category | Collection manner |
| --- | --- |
| Time | A current system time is obtained. |
| Time when an application is switched to a foreground | The time is obtained by collecting a current system time or obtaining a timestamp when the application is switched. |

TABLE 1-continued

| Data category | Collection manner |
| --- | --- |
| A package name of a foreground application | The package name of the application is obtained by using a getApplicationInfo method provided by the package manager 224-d (PackageManager). Collection-related module: PackageManager |
| Bluetooth connection status | A Bluetooth device list bound to a device is obtained, and whether a Bluetooth device in a connected state exists is determined. Alternatively, the Bluetooth connection status may be passively obtained by monitoring BluetoothDevice.ACTION_BOND_STATE_CHANGED. Collection-related module: Bluetooth device 224-h (BluetoothDevice) |
| Network connection status | A current network status is obtained by using a getActiveNetworkInfo method provided by a CONNECTIVITY_SERVICE system service. Alternatively, a current network status may be passively obtained by registering an action: ConnectivityManager.CONNECTIVITY_ACTION. Collection-related module: connectivity manager 224-c (ConnectivityManager) |
| Notification list status | A current notification information list residing in a status bar is obtained by using a getActiveNotifications method provided by a system service NOTIFICATION_SERVICE, and the list is traversed to obtain, by using a getPackageName method, an application package name associated with notification information. Alternatively, a notification information list may be passively obtained in a NotificationListenerService manner. Collection-related module: notification manager 224-b (NotificationManager) |
| Charging cable connection status | A specific intent (ACTION_BATTERY_CHANGED) is sent to a power manager (BatteryManager) to learn whether a terminal device is currently connected to a charging cable. Alternatively, the charging cable connection status may be passively obtained by registering android.intent.action.ACTION_POWER_CONNECTED or android.intent.action.ACTION_POWER_DISCONNECTED. Collection-related module: power manager 224-a (BatteryManager) |
| Headset cable connection status | System broadcast (ACTION_HEADSET_PLUG) is monitored, and a latest state is buffered when a connection status changes. Collection-related module: wired access manager 224-g (WiredAccessoryManager) |
| GPS information | A location change is monitored (LocationListener), and latest location data is buffered when a location changes. Collection-related module: location manager 224-e (LocationManager) |
| Application type | Attributes flags and hwFlags of an application package name are obtained by using a getApplicationInfo method provided by PackageManager of a system service, and an application type (also referred to as a built-in type) is determined by combining the two attributes. Collection-related module: PackageManager |
| Application layout information | A desktop layout database is accessed to query for desktop layout information of an application corresponding to a package name. Note: When a user uses a third-party desktop application, the desktop layout information cannot be obtained by using the method, and therefore a package name of the current system desktop application needs to be determined. Collection-related module: view system 224-i (View System) |

An Android system provides a function interface to obtain some data. Table 1 describes a module (for example, PackageManager) or a function (for example, getActiveNotifications) related to a method for obtaining the data. Referring to FIG. 2, a person skilled in the art may use another obtaining manner according to a requirement. This is not limited in this application. Modules and functions that are invoked in other systems different from the Android system may be different, and this application is not limited to the Android system.

The foreground application in Table 1 is an application currently running in a foreground. Such an application is considered as an application that is currently used by a user and that is relatively important to the user. The user also uses some applications running in a background, for example, a music play application. A collection time of this type of application may be set to a moment at which this type of application is started, that is, a moment at which this type of application is switched to the foreground for the first time.

The foregoing data collection process is triggered when a key event is detected. The key event herein may include one or more of the following events: a foreground-background switching event, an application installation event, an application uninstallation event, a notification event caused by a change in a system status, or a notification event caused by a change in geographical location information. That the geographical location information changes may also be that whether a semantic geographical location changes is first identified, for example, whether the semantic geographical location changes from a home to an office location. Data collection is started if the semantic geographical location changes. Key events are not limited to the foregoing examples. In summary, the key event mainly depends on information that needs to be collected. If it is detected that the information that needs to be collected may change, the foregoing data collection process may need to be started.

In the collected data, a time when an application is switched to the foreground may be the current system time. For example, data collection is performed when the foreground-background switching event is detected. In this case, the collected current system time can be considered as a switching time of the current foreground application. If data collection is performed under triggering of another event, a timestamp that is used to indicate a switching time and that is recorded when the current foreground application is switched may be used to obtain the time when the application is switched to the foreground. When the application is switched to the foreground, the timestamp is recorded by using a system time at that time.

In this application, "a time when an application is switched to a foreground" is also sometimes referred to as "a time when an application is used".

The collected data may be further classified into two types in terms of a final use manner: (1) data that can be directly used, for example, data such as the Bluetooth/network/headset/charging cable connection status, the notification list status, and the application type that are shown in Table 1, where through feature extraction, the data may be directly used as an input parameter for model training; and (2) data that needs to be processed, mainly including two types: information related to an application sequence feature and GPS location information, where the data needs to be further processed, to be converted into another form for parameter input. The type (2) is mainly described in detail below.

For the GPS location information, semantic locations need to be clustered, such as a home and an office location. Once the two geographical locations are interchanged, a system pushes a broadcast indicating that semantic location information changes. In some other embodiments, the GPS location information may be directly used.

It should be understood that a process of processing data may occur before the data is stored, or data may be processed before the data is used for model training.

The information related to an application sequence feature mainly includes a package name of a foreground application and a time when an application is switched to the foreground. By collecting history records (which may be considered as track records of using an application by a user) of the two types of information, the following three types of information may be further obtained through statistics collection: (a) k1 recently used applications; (b) k2 most possible pre-order applications in current foreground applications; and (c) k3 most possible post-order applications in the current foreground applications. Values of k1, k2, and k3 may be equal or may be unequal. The three types of information, namely, (a), (b), and (c), are collectively referred to as application sequence feature data.

(a) includes k1 applications recently used by a user before a current foreground application is used, and the k1 applications may be directly obtained based on each application and a use time of each application that are in stored historical data. For example, it is assumed that k1=2, a current application use time is 18:00, and it is determined, based on the use time of each application, that recent times of using an application before the current application use time are 15:45 and 15:30. In this case, the k1 applications are two applications used at 15:45 and 15:30. In some other embodiments, k1 may also include a current foreground application.

For (b) and (c), a multi-order association relationship between applications needs to be obtained by using a mathematical method through statistics collection from a historical track of using an application by the user. A statistical model of the multi-order association relationship is described below.

In this embodiment, a matrix U[M*M] is used to represent an association relationship between M applications installed on the terminal device 100, and U [i*j] represents a quantity of times of directly switching from an application i to an application j, where i and j each are a positive integer less than or equal to M. For example, if an operation of switching the application i to the application j occurs at a specific moment, the record U [i*j] is increased by 1.

It should be noted that this is for a foreground application. To be specific, an application currently located in the foreground directly changes from the application i to the application j. In other words, the user uses the application i and then uses the application j, that is, the application i is directly switched to the application j.

Further, a quantity of inter-application jumps may also be considered. If the application i is directly switched to the application j, it indicates that the two applications may be strongly correlated. However, if the application i is switched to the application j after the application i jumps several times, it also reflects that the two applications may have a possible association. Based on such implementation, a jump quantity parameter may be added. For example, if the application i is switched to the application j after the application i jumps d times, a record U[i,j][d] is increased by 1.

If a quantity of jumps is excessively large, it indicates that an association relationship between applications is quite weak and may be ignored. Therefore, a maximum of D jumps may be set (for example, a value of D is 5).

In this case, each element U'[i,j] in an incidence matrix of the application i and the application j may be defined as follows:

$$U'[i,j]=\alpha U[i,j][0]+\beta U[i,j][1]+\ldots+\gamma U[i,j][D] \qquad (1)$$

According to the foregoing described method, U'[,j] (a column j of the matrix) may represent a possibility of jumping from another application to the application j, and U[i,] (which represents a row i of the matrix) may represent a possibility of jumping from the application i to another application. From this matrix, k2 most possible pre-order applications of an application and k3 most possible post-order applications of the application may be obtained. For example, when a current foreground application is an application v, k2 maximum values may be successively selected from M'[,v], and row values corresponding to the k2 values are k2 most possible pre-order applications of the application v; k3 maximum values are successively selected from U'[v,], and column values corresponding to the k3 values are k3 most possible post-order applications of the application v.

The application sequence feature data is stored in the memory 180 together with other collected data for model training in a next phase. In a real-time application ranking process, the foregoing method is also used to obtain application sequence feature data corresponding to a foreground application.

Figure 6:
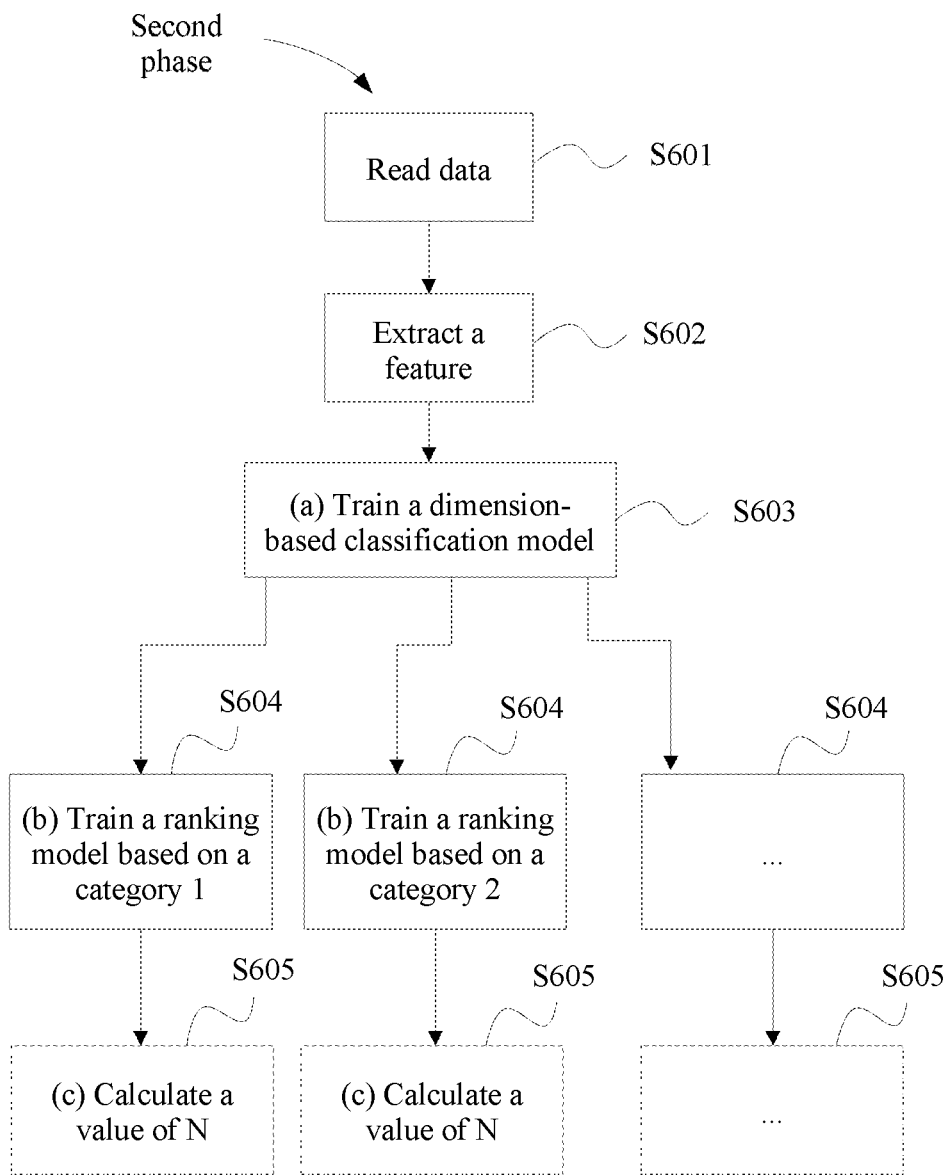
FIG. 6 is a schematic flowchart of a model training method in a resource management method.

FIG. 6 is a schematic diagram of the model training process in the second phase. After data collection is performed for a period of time, some data is already stored in the memory 180, and the data reflects a regularity for using an application. Such a regularity needs to form a reusable model through machine learning. This is performed in the model training process. As shown in the figure, data is read from the memory 180 (S601), an operation such as feature extraction (S602) is performed on the data, and then a dimension-based classification model is trained, that is, habits of using an application by a user are classified based on one or more dimensions (S603). After the classification, ranking models are separately trained for different categories (S604), and training results are stored in the memory for use in application ranking in the third phase. Further, in this phase, a quantity N of applications frequently used by the user may be predicted (S605). Three related model algorithms are separately described below.

(a) Training a Dimension-Based Classification Model (S603)

Habits of using an application by a user may be different in some specific dimensions. For example, in a time dimension, habits of using an application by a user in a working time period and a non-working time period (which may also be referred to as a rest time period) may be significantly different. In this case, if a ranking model is generally constructed to rank applications, a quite large deviation may occur. Training the dimension-based classification model is exploring fine-grained classification of the habits of the user in some dimensions, so as to eliminate an error caused by such a difference, and further improve ranking accuracy.

Figure 7:
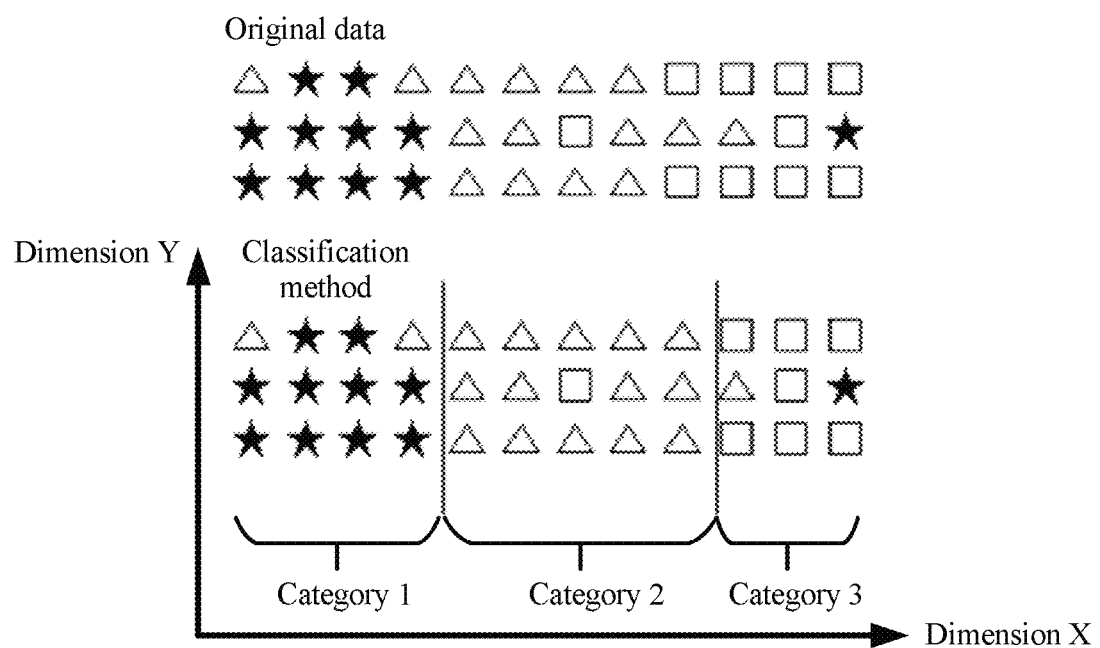
FIG. 7 is a schematic diagram of a principle and an effect of classifying application use regularities based on one or more dimensions.

For different classification based on one or more dimensions, a classification result may be obtained by applying some classification algorithms to original data. As shown in FIG. 7, the original data is classified into three categories in a dimension X. Further, each category may be further classified into more categories in a dimension Y, and details are not described. This is also a basic principle of an entropy production algorithm described below.

In this embodiment, a time dimension is used as an example, and a time is classified into two categories: a working time period and a non-working time period. Based on one day time, the method is to find one or two time points to distinguish between a working time and a non-working time of a user. The following two classification manners may be included in specific implementation: (1) single-line classification, that is, classification in forms of [0:00-x] and [x-24:00], where there is only one variable x; and (2) double-line classification, that is, classification in forms of [0:00-$x_1$], [$x_1$-$x_2$], and [$x_2$-24:00], where there are two variables $x_1$ and $x_2$. The double-line classification is used as an example below.

Data is first read from the memory 180. The data used herein mainly includes a package name of an application and a time when the application is used.

One day time is divided into 24 time periods, and each time period includes one hour. Based on the read data, statistics about statuses of using an application by the user are collected in all the time periods. In this embodiment, statistics about use statuses of an application in any time period are collected by using a two-dimensional matrix S. For example, S[h][i] represents a total quantity of times of using an application i in a time period h. Therefore, a total quantity $Sum_{[h_1,h_2]}(i)$ of times of using the application i in a time period [$h_1,h_2$] and a ratio $f_{[h_1,h_2]}(i)$ of the quantity of times of using the application i in the time [$h_1,h_2$] to a quantity of times of using all applications may be respectively obtained through calculation by using the following formulas (2) and (3):

$$Sum_{[h_1,h_2]}(i) = \sum_{h \in [h_1,h_2]} S[h][i] \qquad (2)$$

$$f_{[h_1,h_2]}(i) = Sum_{[h_1,h_2]}(i) \Big/ \sum_i Sum_{[h_1,h_2]} \qquad (3)$$

where $f_{[h_1,h_2]}(i)$ may also be referred to as frequency for using the application i in the time [$h_1,h_2$].

Therefore, an information entropy $E_{[h_1,h_2]}$ of using an application by the user in the time period [$h_1,h_2$] is defined as follows:

$$E_{[h_1,h_2]} = \sum_i f_{[h_1,h_2]}(i)^*(-1)^* \log_2 f_{[h_1,h_2]}(i) \qquad (4)$$

In this way, an entropy generated by one double-line classification based on $x_1$ and $x_2$ is calculated as follows:

$$E(x_1,x_2) = f(0,x_1)^* E_{[0,x_1]} + f(x_1,x_2)^* E_{[x_1,x_2]} + f[x_2,23]^* E_{[x_2,23]} \qquad (5)$$

where $f(x_1,x_2)$ is a ratio of a quantity of times of using all applications in the time period [$x_1, x_2$] to a quantity of times of using all the applications in the whole day, and is calculated as follows:

$$f(x_1, x_2) = \sum_{h \in [x_x, x_k]} \sum_i S[h][i] \Big/ \sum_{h \in [0,23]} \sum_i S[h][i] \qquad (6)$$

Therefore, resolving a problem is finally transformed into finding two classification times $x_1$ and $x_2$, to minimize an entropy value of this classification, that is:

$$\arg\min E(x_1,x_2) \qquad (7)$$

For example, a finally obtained result may be that $x_1$ and $x_2$ are 9:00 and 18:00 respectively. The three time periods are a non-working time period [0:00-9:00], a working time period [9:00-18:00], and a non-working time period [18:00-24:00]. This is denoted by Table 2 as follows:

TABLE 2

| | |
|---|---|
| [0:00-9:00] | Non-working |
| [9:00-18:00] | Working |
| [18:00-24:00] | Non-working |

In this embodiment, both [0:00-9:00] and [18:00-24:00] are considered as non-working time periods, and a ranking model is trained for the non-working time periods. In some other embodiments, a ranking model may be separately trained for each of [0:00-9:00] and [18:00-24:00]. In addition, it should be noted that semantic meanings of "working" and "non-working" are given based on a current living habit of most people. Actually, a meaning of the method is to reflect that two different regularities are presented in an application use history. Such semantic classification as "working" and "non-working" is not necessarily used in this application.

(b) Training a Ranking Model (S604)

Importance of an application on a terminal device is related to a use probability of the application, and a higher use probability indicates higher importance. Use probabilities of an application may be different in different states of a system. For example, a use probability of each application in a network connection state is different from a use probability of the application in a network disconnection state. In this case, application importance ranking in a network connection case is different from that in a network disconnection case. Therefore, a current system status needs to be considered when applications are ranked.

It should be noted that the network connection state or the network disconnection state is merely an example, and another state related to the terminal device may also be considered, for example, whether a headset is connected, whether Bluetooth is connected, whether a charging cable is connected, or a current location of the terminal device.

In summary, ranking model training mainly includes the following several steps.

Data read: Data is read from the memory 180. The data that needs to be used for training herein mainly includes an application use time, application sequence feature information, system status information, and semantic location information. Content and an obtaining process of the application sequence feature information have been described above in detail. The system status information mainly includes a connection status of a headset, a charging cable, and a network. For example, the semantic location information may include a home and an office.

Feature extraction: Through statistics collection, identification, vectorization, and/or the like, the read data is converted into a feature vector/feature matrix that can be processed by a machine learning algorithm. This step specifically includes the following: (s1) For the application use time and the application sequence feature information, the application use time and the application sequence feature information are converted into vectors through vectorization, a time slice, and working day/non-working day identification. For example, the application use time is divided into two parts: a date and a time period. Monday, Tuesday, . . . , and Sunday are respectively mapped to 0, 1, . . . , and 6. Time periods are mapped based on a segment. For example, [9:00-18:00] is a segment, and all times in the time period are mapped to a same number. (s2): For the system status information, a feature is extracted from the read system status information, and the system status information is converted into a vector by using a discretization/enumeration method. (s3) For the semantic location information, the read semantic location information is converted into a vector through encoding. (s4) Normalization processing is performed. [0, 1] normalization is performed on a value by using a maximum/minimum value method, and normalization is performed on a variance of the value by using a whitening method. (s6) Feature matrix combination is performed. Data in all dimensions is combined to form a feature matrix, and the feature matrix is provided for an algorithm training module.

Model training and storage: Data is divided into a plurality of groups, and a model is trained for each of the plurality of groups of data to obtain a plurality of models. The data may be alternatively divided before feature extraction, and feature extraction is separately performed after the data is divided. For example, according to classification based on the time dimension provided in the foregoing embodiment of this application, two models are separately trained for data in [9:00-18:00] from Monday to Friday and data in [0:00-9:00] and [18:00-24:00] from Monday to Friday, and a generated ranking model (parameter information of a machine learning model) and a corresponding time period are stored into a database. Data of the whole Saturday and Sunday may be trained as data in a non-working time period.

An example of a storage result is as follows:

TABLE 3

| | |
|---|---|
| [9:00-18:00] (Working time period) | Parameter information of a machine learning model 1 |
| [0:00-9:00] [18:00-24:00] (Non-working time period) | Parameter information of a machine learning model 2 |

A training process is described below in detail by using a machine learning algorithm Softmax as an example. The Softmax algorithm is selected because the algorithm is an incremental learning algorithm. The incremental learning algorithm means that it can be ensured in the training process that feature data of a new training sample is merged based on a model parameter that is originally learned, to further optimize the parameter, that is, original sample data does not need to be retained. In this way, a storage amount of data can be reduced, and storage space can be saved.

Through statistics collection, identification, vectorization, and/or the like, the obtained data, such as the application sequence feature information and the system status information, is converted into a feature vector $s=(s1, s2, \ldots, sW)$ that can be processed by the Softmax algorithm, where W is a quantity (or a length) of feature vectors. An application set is represented by using a vector $a=(a1, a2, \ldots, aM)$, where $aj$ represents a $j^{th}$ application, and M represents a quantity of applications installed on a mobile phone. A purpose is to calculate a ranking function (namely, a ranking model) $h_\theta (s)$. Certainly, a premise of calculating the ranking function is to calculate a parameter $\theta$.

Therefore, based on the Softmax algorithm, the ranking function is defined as follows:

$$h_\theta(s) = \frac{1}{\sum_{i=1}^{M} e^{\theta_i s}} \begin{bmatrix} e^{\theta_1 s} \\ \vdots \\ e^{\theta_M s} \end{bmatrix} \quad (8)$$

A cost function of this model is as follows:

$$J(\theta) = -\frac{1}{k} \left[ \sum_{i=1}^{k} \sum_{i=1}^{M} 1\{y^{(i)} = j\} \log \frac{e^{\theta_j x^{(i)}}}{\sum_{l=1}^{M} e^{\theta_l x^{(i)}}} \right] + \frac{\lambda}{2} \sum_{i=1}^{M} \sum_{j=1}^{w} \theta_{ij}^2 \quad (9)$$

where k represents a quantity of samples that are input for training; M represents a quantity of categories, namely, a quantity of applications; W represents a length of the feature vector s; $\lambda$ represents a weight ($\lambda>0$); and $1\{.\}$ is a characteristic function, and a value rule of the function is as follows:

1{the expression is true}=1
1{the expression is false}=0

$y^{(i)}=j$ identifies that an identifier of an application package name in an $i^{th}$ sample is j in the vector a. Therefore, if that the identifier of the application package name in the $i^{th}$ sample is j in the vector a is true, $1\{y^{(i)}=j\}=1$; or if that the identifier of the application package name in the $i^{th}$ sample is j in the vector a is false, $1\{y^{(i)}=j\}=0$.

A gradient descent method or a Newton method is used to minimize $J(\theta)$ to calculate $\theta$ during model training. The gradient descent method is as follows:

$$\theta'_j = \theta_j - \alpha \nabla_{\theta_j} J(\theta) \qquad (10)$$

$$\nabla_{\theta_j} J(\theta) = -\frac{1}{k} \sum_{i=1}^{k} \left[ x^{(i)} \left( 1\{y^{(i)} = j\} - \frac{e^{\theta_j x^{(i)}}}{\sum_{l=1}^{M} e^{\theta_l x^{(l)}}} \right) \right] + \lambda \theta_i \qquad (11)$$

where $\alpha$ is a fixed parameter, and j represents a quantity of iterations.

In this embodiment, training is performed every 24 hours to constantly update an identification model, so that the identification model is increasingly close to a real use habit of the user.

After the parameter $\theta$ is calculated through the foregoing model training, the ranking function $h_\theta$ (s), that is, a ranking function used during real-time ranking, is known. The information obtained through calculation is stored in the memory 180 in the form of Table 3 for use during real-time ranking.

(c) N-Value Prediction Algorithm (S605)

A value of N is a positive integer, and reflects a quantity of applications frequently used by a user in a specific classification, for example, a quantity of applications frequently used by a user in a specific time period (for example, a working time period). The N-value prediction algorithm is used to determine the value of N. The value of N may be used for resource management. Because the N applications are frequently used by the user, resources of the N applications may be properly protected during resource management.

Based on the foregoing description, in this embodiment, use regularities of a user are classified into two categories by using time as a dimension, as shown in Table 3. In this case, same classification may also be performed on calculation of the value of N by using time as a dimension. An output result is shown in Table 4: Values of N are separately calculated for the working time period and the non-working time period. In this way, prediction of the value of N is more accurate.

In some other embodiments, only one value of N may be calculated for all categories, or a classification manner for calculating the value of N is different from a classification manner in Table 3. In some other embodiments, a non-time dimension, such as a location dimension, may be used to calculate the value of N. For example, a value of N is calculated for data related to a home, and a value of N is calculated for a dimension related to an office location.

The value of N may be calculated and stored in advance, for example, stored in Table 4; or the value of N may be obtained by invoking the N-value prediction algorithm in real time when the value of N is required for resource management.

TABLE 4

| [9:00-18:00] (Working time period) | Parameter information of a machine learning model 1 | Value of N |
|---|---|---|
| [0:00-9:00] [18:00-24:00] (Non-working time period) | Parameter information of a machine learning model 2 | Value of N |

In an implementation of the N-value prediction algorithm, use records of applications in a same time period of a previous day or a plurality of days are obtained, statistics about a quantity of use times of each application are collected, and then V applications having a largest quantity of use times are successively found based on a descending order of quantities of use times. If a sum of quantities of use times of the V applications can reach 90% of a sum of quantities of use times of all the applications in the time period, N=V.

Another implementation of the N-value prediction algorithm is second-order moving average. A quantity $N_t$ of applications that need to be protected in a specific time period (or a category in another dimension) on a $t^{th}$ day is an average of quantities of applications that need to be protected in the same time period on a $(t-1)^{th}$ day and a $(t-2)^{th}$ day plus a weight of a variance of the quantities of applications, as shown in Formula (12):

$$N_t = \frac{(N_{t-1} + N_{t-2})}{2} + \alpha * \sigma \qquad (12)$$

where $\alpha$ is a weight coefficient, and $\sigma$ is a variance value of all $N_t$ in data. For example, a value of $\alpha$ is 0.005. A value of N may be calculated for a first day and a second day by using the foregoing implementation.

Each time a value of N is calculated based on Formula (12), a variance value $\sigma$ of all historical $N_i$ needs to be calculated, so that all historical $N_i$ needs to be stored. In this embodiment, to reduce a storage amount of historical $N_i$ an incremental calculation method is used to evaluate the variance value of all $N_i$:

$$\sigma^2 = \frac{P[\sigma_H^2 + (\overline{X} - \overline{H})^2] + Q[\sigma_A^2 + (\overline{X} - \overline{A})^2]}{P + Q} \qquad (13)$$

where $\overline{X}$ is an average of all data, $\sigma_H^2$ is a variance of historical data, $\overline{H}$ is an average of the historical data, P is a quantity of historical data, $\sigma_A^2$ is a variance of newly added data, $\overline{A}$ is an average of the newly added data, and Q is a quantity of newly added data.

Figure 8:
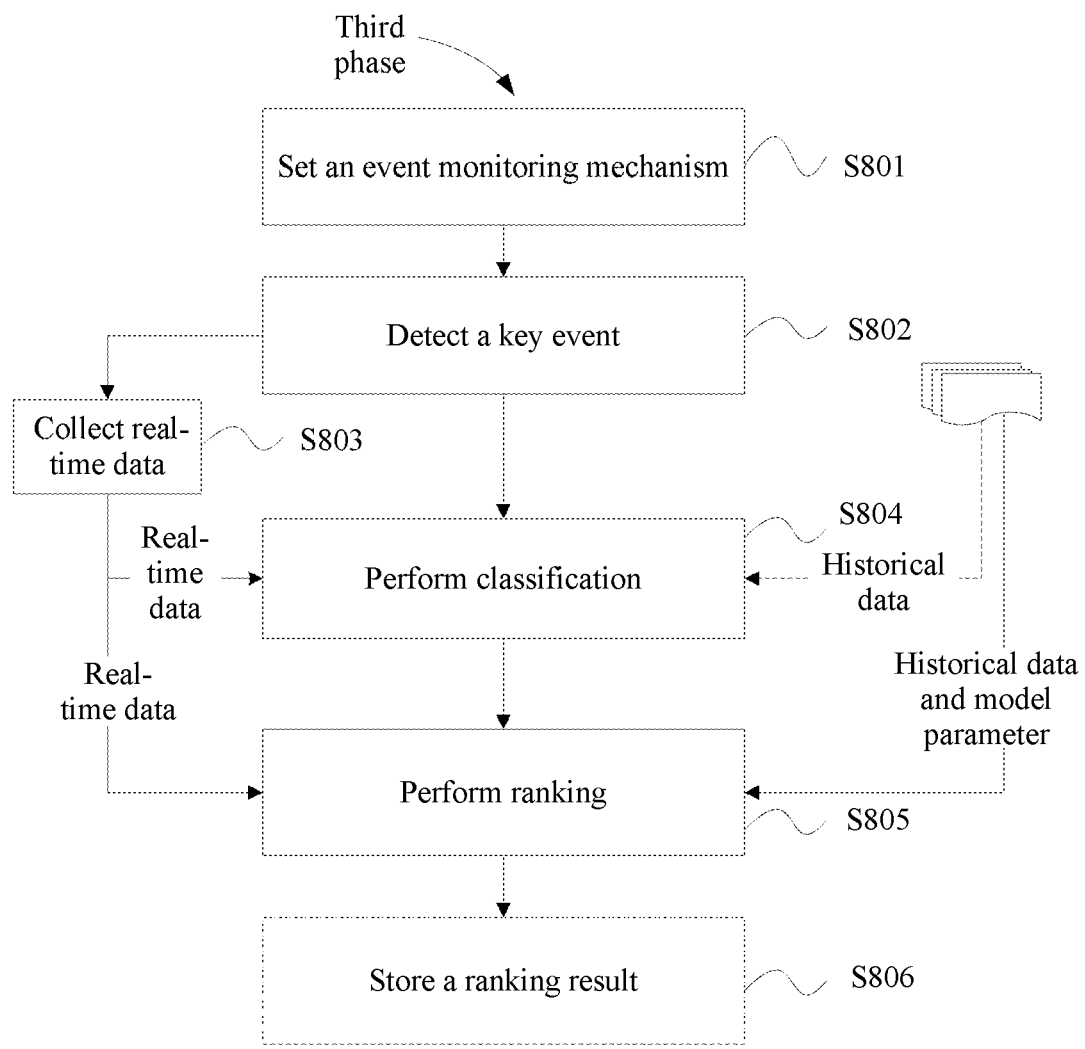
FIG. 8 is a schematic flowchart of a real-time application ranking method in a resource management method.

FIG. 8 is a schematic diagram of the real-time application ranking process in the third phase.

The real-time ranking module 320 sets an event monitoring mechanism to detect a key event that triggers real-time ranking (S801). After detecting the key event (S802), the real-time ranking module 320 triggers the data collection module 221 to collect real-time data (S803). The real-time data may include a system time of a terminal device, current status data of the terminal device, and current location data of the terminal device.

The following several key events are included: (1) foreground-background switching; (2) application installation and uninstallation; (3) a change in a system status, that is, a change in a connection status of a headset/network; (4) receiving of an intelligent scenario broadcast notification, that is, a notification indicating that a semantic geographical location (company/home) changes, and the like.

A category (S804), that is, a working time period or a non-working time period, in which the terminal device is currently located in a time dimension is determined based on the collected system time of the terminal device and the training result of the dimension-based classification model (Table 2). A ranking model of a related classification is selected or only a model parameter is obtained based on a ranking model training result (Table 3), and then importance ranking of all applications in a real-time scenario is predicted based on historical data, data collected in real time, and the like (S805). The historical data herein is historical collected and stored data. For details, refer to Table 1.

It should be understood that data to be input into a ranking model may need to be preprocessed. For example, sequence feature data related to a current foreground application needs to be obtained by collecting statistics on collected real-time data and some historical data. If semantic location data needs to be input into the model, location information of the terminal device that is collected in real time needs to be converted into semantic location data through clustering, or corresponding semantic location data is obtained based on a preset correspondence between a GPS location range and a semantic location. Whether preprocessing is required, and what preprocessing needs to be performed to match model training are not specifically limited in this application.

It should be noted that Table 2 and Table 3 are merely examples for ease of understanding. In a specific implementation process, the two tables may be combined into one table, that is, one correspondence. In addition, a ranking model or a model parameter may be determined at a time based on a current time of a system.

It should be noted that in this embodiment, a system time collected in real time is used for classification in S804. In another embodiment, if a different dimension is used for classification, classification may be performed according to a requirement by using other data and/or historical data that are/is collected in real time.

The real-time ranking module 320 finally stores a ranking result (S806) for querying during resource management in the fourth phase. In some other embodiments, ranking in the third phase may occur only when ranking is invoked in the fourth phase in real time, and then the ranking result is returned in real time.

Further, after ranking is performed, a quantity N of applications frequently used by a user in the time period may be obtained by using an N-value prediction algorithm or a pre-stored correspondence (for example, Table 4), and this is not shown in FIG. 8. This step is optional, and the value of N may be calculated in real time when the value of N is required for resource management.

For a new application that has recently been installed on a mobile phone by a user, when applications are ranked by using the foregoing method, importance evaluated for the application may be quite low because an excessively small quantity of data is collected. Therefore, this application further provides a supplementary mechanism for a newly installed application, and newly installed applications are ranked by calculating a score (score).

Two factors are mainly considered for ranking of newly installed applications: (1) a use possibility weight, where the use possibility weight may also be referred to as an LRU weight in this embodiment; whether a currently newly installed application appears in an LRU (last recently used) list is checked, to determine whether the newly installed application has recently been used; and if the newly installed application appears in the LRU list, LRU is 1, or if the newly installed application does not appear in the LRU list, LRU is 0; and (2) a time attenuation weight, where an attenuation weight of a time difference between a current time and a time when the newly installed application is installed is calculated. The LRU list stores identifiers of a plurality of recently used applications. For example, if a length of the list is 8, eight recently used applications are stored in a time sequence, and each time a newly used application is inserted, an application used a longest time before is deleted.

Based on the two factors, a score of a newly installed application is defined as follows:

$$\text{Score} = \alpha_1 \times \text{LRU} + \alpha_2 \times e^{-t} \quad (14)$$

where $\alpha_1$ is an LRU weight coefficient, $\alpha_2$ is a time attenuation weight coefficient, t is a discrete value of a time difference between a current time and a time when an application is installed. Scores of all newly installed applications are calculated and ranked.

In some other embodiments, another form may be used to determine whether a newly installed application has recently been used. For example, a last use time of the newly installed application is recorded, and then it is determined whether a time difference between the last use time and a current time is less than a threshold.

When N applications frequently used by a user need to be recommended, N–x applications ranked at the top are recommended based on the ranking result obtained by using the Softmax algorithm, and x applications are recommended based on a ranking result of newly installed applications, so that N applications are recommended in total by using the two recommendation methods. The N applications are used as currently most important applications in a system, and are used for subsequent resource management.

The x newly installed applications may be successively selected x applications with a maximum score, and a value of x may be set according to a requirement, for example, may be 2. Alternatively, a condition is set: A score of a newly installed application that is recommended needs to be greater than a threshold (for example, 0.5) and/or a maximum quantity of recommended applications is 2. How to specifically set the condition is not limited in this application.

An embodiment of system resource management in the fourth phase is described below. A method described below may be partially or completely implemented by the decision execution module 223.

A main objective of system resource management is to ensure a resource supply for a foreground application or an application with high importance. This embodiment provides a method for temporarily freezing (which may also be referred to as instantaneously freezing) an application process, to temporarily freeze some unimportant processes when a required quantity of resources is relatively large, thereby providing more sufficient resources for using an important process, and avoiding affecting user experience due to application stalling caused by insufficient resources.

Process freezing is usually a procedure in which a process is set to an uninterruptible sleep state or a stop state and is placed in a wait queue. The "process" may be understood as an instance of a running application, and the two may be equally understood in some descriptions.

In a conventional desktop computer operating system, a freezing technology is mainly used to set a status of each process in a process list to a sleep state or stop state when a system is hibernated (hibernate) or suspended (suspend), and store contexts of all the processes into a hard disk. In this way, when the system is restored from a hibernated state or suspended state, the system can restore a previous running state by unfreezing all the frozen processes.

Different terminal operating systems use different freezing technologies. Some terminal operating systems use a pseudo background technology. To be specific, after an application process is switched to a background and runs in the background for a period of time, the process is frozen, and the process is unfrozen and continues to run only after a user switches the application to the foreground again. When the Android operating system runs out of memory, an OOM (out of memory) module or an LMK (low memory killer) module triggers memory reclaiming to reclaim the memory by killing a process. However, as a result, a time of restarting a killed application is longer. In addition, an original state of the user cannot be stored, degrading user experience. Therefore, a freezing technology is introduced to resolve the problem. Specifically, when the system runs out of memory (for example, a remaining memory capacity is less than a threshold), a process is first frozen, a context of the process is switched to a ROM, and the memory is released. In this way, when the application is restarted next time, the process is unfrozen and continues to run. This not only avoids that an original state is lost because the application is killed, but also reduces a time of restarting the application, thereby improving user experience.

In conclusion, an existing freezing technology is mainly used to process a process that is not used for a long period of time, or release a resource for a long period of time, and the process is unfrozen only when the user needs the process.

An instantaneous freezing technology is proposed in this embodiment. Another application process is temporarily frozen, to temporarily make way to ensure that resources required for important applications or important scenarios are supplied in time. In addition, after a required quantity of resources is reduced, these frozen application processes are automatically restored and unfrozen again. In this way, processing and response speeds of the applications are increased while avoiding experience degradation caused after some other applications are permanently frozen (for example, after downloading is frozen for a long period of time, the downloading cannot continue to be performed), thereby improving user experience.

When specific events (such as application start, activity switching, photographing, sliding, screen-on/off, and gallery zooming) that instantaneously require a relatively large quantity of resources are triggered, to avoid impact on these specific events that is caused by execution of a non-important application, the non-important application is forcibly frozen temporarily, and after a key event is completed, running of some temporarily frozen applications is restored based on importance ranking of the applications.

The "specific event" herein is usually related to an important application. For example, the important application is a foreground application or a sensible background application. For example, the sensible background application is a music play application running in a background. A non-important application to be temporarily frozen may be selected according to a requirement. For example, all applications other than the first N applications are selected based on the application importance ranking result provided in the foregoing embodiment, and are temporarily frozen (N herein is the quantity of applications frequently used by the user that is calculated in the foregoing embodiment), or all background applications are selected to be temporarily frozen, or another application that is selected according to a requirement and that is currently non-important based on determining or is a non-important application within a period of time based on prediction.

Figure 9:
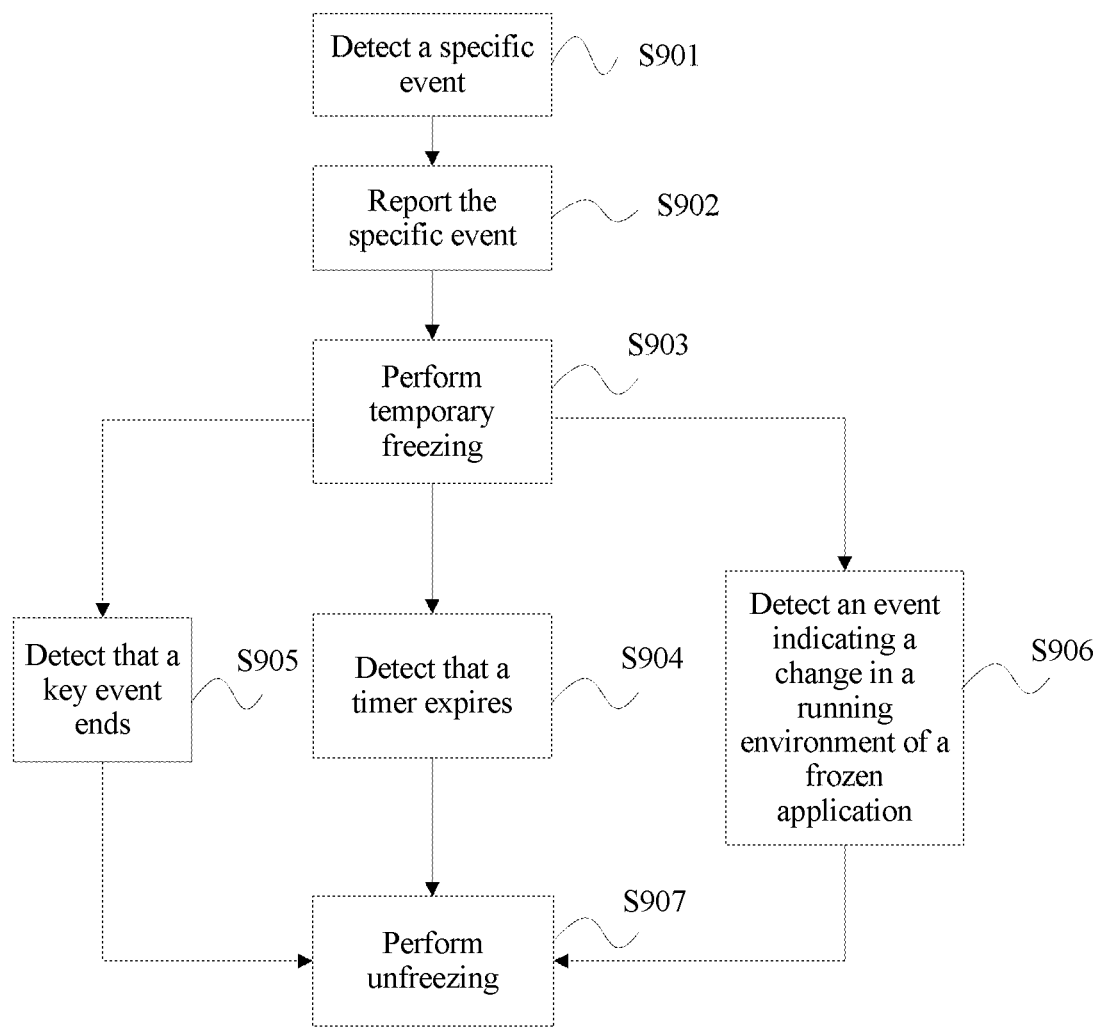
FIG. 9 is a schematic flowchart of a temporary freezing method in a resource management method.

As shown in FIG. 9, a detection function monitors a specific event (S901), reports the specific event by using a dotting report function of an activity manager service (Activity Manager Service, AMS) (S902), and temporarily freezes some applications (S903). A freezing time, for example, 1.5 s, is set when a temporary freezing function is invoked. The freezing time may be preset and cannot be changed, or can be configured by a user. The freezing time is implemented by using a timer, and an application is unfrozen (S907) after it is detected that the timer expires (S904).

Alternatively, execution of a specific event may be monitored, and an application is unfrozen after it is detected that the specific event ends (S905). Detection of an end of the specific event herein may also be implemented through reporting by using the dotting report function of the activity manager service. Step S904 and step S905 may be understood as two normal unfreezing conditions, and an application may be unfrozen when any one or both of the two conditions are met.

All applications or only some applications may be unfrozen when unfreezing is performed. When an application that needs to be unfrozen is selected, some applications with relatively high importance may be selected based on application importance ranking and are unfrozen. Another application may continue to be frozen because the application has quite low importance and may not be used by the user for a long period of time.

Before a specific event is completed, and when specified timing duration has not arrived, a frozen application may be unfrozen ahead of schedule (S907) if an event indicating a change in a running environment of a frozen application occurs (S906), for example, the frozen application is switched to a foreground, the frozen application exits, the frozen application receives a binder asynchronous message, and a notification message of the frozen application is tapped by a user. Herein, "the event indicating a change in a running environment of a frozen application" is usually related to a frozen application. Occurrence of the event usually suddenly improves importance of the frozen application, and the frozen application needs to be unfrozen in time. Likewise, monitoring of the event indicating a change in a running environment of a frozen application may also be implemented by the dotting report function of the activity manager service. The event indicating a change in a running environment of a frozen application may be any one of the following events: (1) the application is switched to the foreground; (2) the application exits; (3) the application is re-installed or a version of the application is updated; (4) a dynamic wallpaper application is set to a dynamic wallpaper; (5) an application widget is added to a desktop; (6) a network data packet arrives in an instant messaging (instance message, IM) application, a short message service (short message service, SMS) application, or an email (Email) application; (7) the IM/SMS/Email application in a network disconnection state is connected to a network; (8) another application accesses a provider (provider) or a service (service) of the frozen application; (9) a system or another application simultaneously invokes a frozen process by using a binder; (10) an application that has a widget on the desktop is detected after unlocking; (11) an application that uses a GPS and a sensor is frozen before movement starts; (12) the frozen application processes a headset key; (13) the temporarily frozen application receives a binder asynchronous message; (14) a notification bar is tapped to access the frozen application; (15) the system enters a screen-off state, and so on.

It should be noted that some of the events (1) to (15) relate to a specific application, and this means that the application needs to be unfrozen (if the application is in a frozen state). However, some events do not relate to a specific application, and in this case, some or all of frozen applications are selected to be unfrozen. For example, in (15), it is detected that the system enters the screen-off state. This means that no foreground application visible to the user needs to be protected. Therefore, all frozen applications may be unfrozen, so that the applications can continue to run as soon as possible.

It can be learned that in addition to the two normal unfreezing manners, this embodiment further proposes an emergency unfreezing manner or a manner of performing unfreezing ahead of schedule. Before a specific event is completed, and when specified timer duration has not arrived, but an event indicating a change in a running environment of a frozen application occurs, the frozen application may be unfrozen ahead of schedule, so as to avoid impact on normal use of the application due to freezing.

Continuous operations of a user (for example, the user continuously slides or starts applications) continuously trigger temporary freezing. To ensure that some background applications have an opportunity to run under continuous instantaneous freezing operations, this embodiment further provides a periodic freezing method. Before a freezing operation is performed on an application, a run time of the application after the application is unfrozen is first detected. Temporary freezing may be continuously performed on an application whose accumulated running duration after the application is unfrozen reaches t1 seconds (t1 is preset duration, for example, 10 s). However, temporary freezing may be periodically performed on an application whose accumulated running duration after the application is unfrozen is less than t1. The application is first frozen for t2 seconds and then unfrozen for t3 seconds until a continuous freezing condition is met. Herein, t2 and t3 are preset duration values (t2<t1, and t3<t1), for example, t2=1.5 s, and t3=3 s. In this periodic unfreezing method, it can be well ensured that some background applications can get some opportunities to run when the applications alternately operate in the background and in the foreground for a long period of time, so as to avoid a case in which in long period of time, some important background applications cannot run, or even avoid an exception that occurs because some applications are continuously frozen (for example, after downloading is frozen for a long period of time, the downloading cannot continue to be performed). After an event indicating a change in a running environment of the frozen application is detected, regardless of whether the application is unfrozen, accumulated running duration after the application is unfrozen is reset to 0. This can ensure that all background applications can run for a period of time after the event indicating a change in a running environment is received, so that running and experience of background applications are ensured while preferentially ensuring a high instantaneous resource requirement of foreground applications.

Another embodiment of this application provides a method for scheduling an important task. The task herein may be a process or a thread.

In an ideal state, each task can obtain a same time slice from a CPU, and all tasks simultaneously run on the CPU. However, actually, only one task can run on one CPU at a same moment. In other words, when a task occupies the CPU, another task needs to wait. A completely fair scheduler (completely fair scheduler, CFS) scheduling algorithm is a relatively general scheduling algorithm in an existing Linux system. To achieve fairness, the CFS scheduling algorithm needs to punish a currently running task, so that processes that are waiting are scheduled at a next time. In specific implementation, a CFS measures, by using a virtual run time (virtual run time, vruntime) of each task, a task that is most worthy of scheduling. A ready queue in the CFS is a red-black tree using vruntime as a key value. A process with smaller vruntime is closer to a leftmost end of the entire red-black tree. Therefore, the scheduler selects, at each time, a task that is located at the leftmost end of the red-black tree, and vruntime of the task is the smallest.

It should be noted that the "CPU" mentioned in this embodiment is a minimum processing unit in a computer device, and may also be referred to as a processing core or a core for short.

Figure 10:
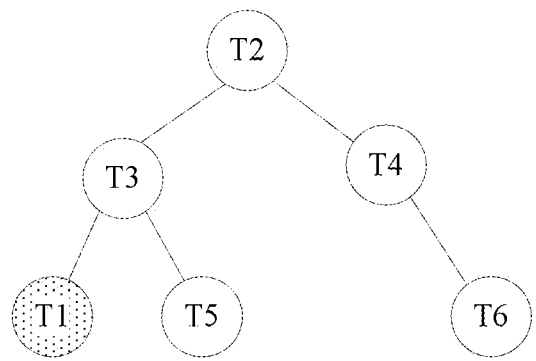
FIG. 10 is an example diagram of a first state of a ready queue.

As shown in FIG. 10, for the binary tree and a task T1 to a task T6 on the binary tree, a sequence in which the CPU executes the tasks is T1-T3-T5-T2-T4-T6. It is assumed that the task T1 is an important task.

The vruntime is calculated by using an actual run time of a task and a weight (weight) of the task, and is an accumulated value. In the CFS scheduler, a concept of a task priority is weakened, but a weight of a task is emphasized. If a weight of a task is larger, it indicates that the task more needs to run. Therefore, a virtual run time of the task is smaller, and there are more opportunities for scheduling the task.

Figure 11:
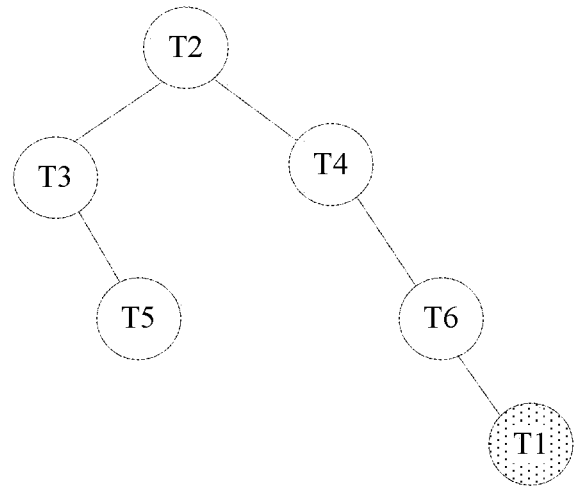
FIG. 11 is an example diagram of a second state of a ready queue.

Because of fairness of the CFS scheduling algorithm, even if a weight of an important task is set to a quite large value, after the important task is executed once, the important task still needs to wait until at least one other task runs. After the task T1 is executed once, a vruntime value of the task T1 becomes larger. After the CFS schedules the task T3, the task T1 is inserted at an end of a queue because the vruntime value becomes larger, as shown in FIG. 11. In this case, the task T1 needs to wait until each of the tasks T3-T5-T2-T4-T6 is executed once before the task T1 is executed again. FIG. 11 is an example. After the task T1 is executed once, the task T1 may be re-enqueued in another location. However, regardless of the location of the task T1, to implement fairness, the CFS always makes the task T1 wait. Because the task T1 is an important task for a user, such waiting may cause system stalling.

This embodiment provides a method for scheduling an important task. In addition to the foregoing ready queue, a new running queue (referred to as a VIP queue below) is created for each CPU, and a structure of the new running queue is similar to that of the foregoing ready queue. An important task is placed in the VIP queue.

An important task is a task that has relatively large impact on user experience, and may include all threads (or processes) of the N applications whose importance is ranked at the top that are mentioned in the foregoing embodiment; or an important task includes key threads in threads of the N applications, such as a UI thread and a render thread; or an important task includes key threads of a current foreground application, such as a UI thread and a render thread.

Important tasks are classified into two types: a static important task and a dynamic important task. The static important task is usually identified in a user mode, for example, a user interface (user interface, UI) thread and a render (render) thread of a foreground application. Importance of the static important task is usually cancelled only when application importance changes. The dynamic important task is an important task on which the static important task depends, and is usually identified in a kernel mode. Once the dependency is released, importance of the dynamic important task is cancelled. The dynamic important task includes a task on which the static important task directly depends, and may also include a task on which the static important task indirectly depends.

The dependency herein may be a data dependency, a lock dependency, a binder service dependency, a control flow dependency, or the like. The data dependency means that execution of a task B needs to depend on output of a task A. The lock dependency means that execution of the task B needs a lock released by the task A. The control flow dependency means that in terms of execution logic, the task B can be executed only after the task A is executed. The binder service dependency is a specific instance of the control flow dependency, and means that the task A invokes a binder function (similar to remote procedure invoking) to require the task B to complete a function and return a running result, so that the task A generates the binder service dependency on the task B.

A Linux system is used as an example to describe a specific implementation process of a dependency detection relationship. Two fields are added to a task control block task_struct: static_vip and dynamic_vip, which are respectively used to indicate flag values of a static important task and a dynamic important task. If static_vip=1, it indicates that the task is a static important task; or if dynamic_vip is not equal to 0, it indicates that the task is a dynamic important task. For a dynamic important task, a plurality of other tasks may simultaneously depend on one task, and reasons for the dependency may be the same or different, for example, a mutex (mutex) lock dependency, an rwsem read/write semaphore dependency, and a binder service dependency. Therefore, the dynamic_vip field is classified into three types that respectively indicate the mutex lock dependency, the rwsem dependency, and the binder dependency; or classified into more types, where the more types are not described in detail. Several types may also be reserved for future extension. Each type is stored by using 8 bits. In this way, each time a corresponding dependency function is invoked, a block value corresponding to the field is increased by 1, and each time the dependency function is completed, the value is correspondingly decreased by 1, until all fields are equal to 0. Then an importance attribute of the task is cancelled, and the task is re-placed into the ready queue for running.

The mutex lock dependency and the binder dependency are used as examples below to describe in detail steps of the mutex dependency and the binder dependency.

A mutex_lock function is invoked in an important task A to obtain a mutex lock, and a lock status is detected in the function. If the lock fails to be obtained, it indicates that the lock has been obtained by another task. The current task A is suspended and enters a sleep state. Code is added to obtain a current owner (a task B) of the lock, a bit corresponding to a value of a dynamic_vip field of a structure of the task is increased by 1, and then the task B is moved to the VIP queue for scheduling and running. When the task B releases the lock mutex unlock, a corresponding value of dynamic_vip in task_struct of the task B is determined and is decreased by 1. If the corresponding value is 0, the task is removed from the VIP queue. A running process of another lock is similar.

When an important task A invokes a binder function of a common task B, a task structure task_struct of the task B is first found in a binder thread write function in a binder driver of a kernel, and a value of dynamic_vip of the task structure is set. Then a corresponding function ID and parameter are transferred to the task B, and the task B is woken up to run. Afterwards, the important task A waits for the task B to return a running result. After the task B completes a corresponding function by using a binder thread read function, before returning the running result to the task A, the task B checks the value of dynamic_vip. If the value of dynamic_vip is 0, the task is removed from the VIP queue.

Figure 12:
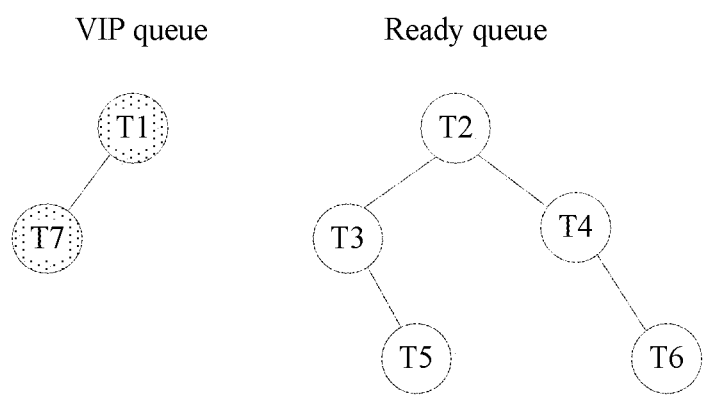
FIG. 12 is an example diagram of two queues corresponding to each CPU.

After a plurality of important tasks are identified in the foregoing manner, these tasks are inserted into the VIP queue. An insertion principle may be the same as that for the foregoing ready queue, that is, each task is inserted based on a value of vruntime of the task. As shown in FIG. 12, the VIP queue includes two important tasks T1 and T7, and vruntime of T7 is currently less than vruntime of T1.

Each time the CPU obtains a next task that needs to be run, the CPU first checks whether a task in the VIP queue needs to be run. If a task in the VIP queue needs to be run, the CPU selects the task from the queue to run. If the queue is empty, the CPU selects a task from the ready queue to run. This ensures that all important tasks can be run before another non-important task, and a function similar to a queue insertion function is implemented for the important tasks.

Further, when a quantity of tasks in the VIP queue is relatively large, to prevent the tasks in the VIP queue from waiting in queue, whether a task in a VIP queue of each CPU is currently delayed may be checked at a proper time. If there is a delayed task, it is determined whether the task is movable. If the task is movable, the task is moved to an idle VIP queue of another CPU. In this way, migration (or referred to as moving) of an important task is implemented, thereby ensuring timely running of the important task, avoiding stalling, and further improving user experience.

Figure 13:
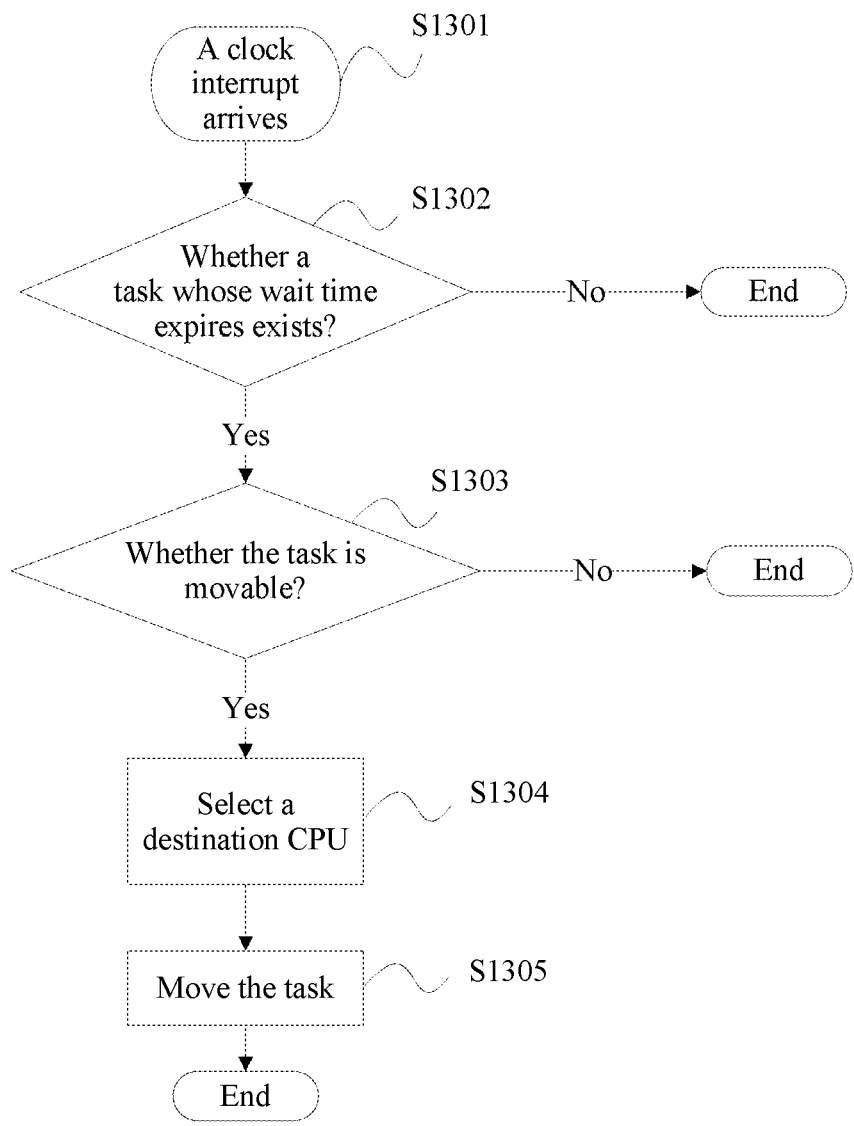
FIG. 13 is a schematic flowchart of a task moving method.

Specifically, referring to FIG. 13, when a clock interrupt arrives (S1301), the kernel checks whether a task whose wait duration exceeds a threshold (for example, 10 ms) exists in a VIP queue corresponding to a current CPU, that is, determines whether there is a delayed task (S1302). If a task whose wait duration exceeds the threshold exists, the kernel further checks whether data and/or an instruction of the task still exists in a cache (cache), that is, determines whether the task is movable (S1303). If all or some of the data and/or the instruction of the task does not exist in the cache (whether the cache is hot), the kernel selects a destination CPU from a CPU cluster (cluster) in which the current CPU is located (S1304), where no task waits in a VIP queue of the destination CPU and there is no real-time task in the VIP queue of the destination CPU; and migrates the task to the destination CPU (S1305). A task can be migrated by invoking a migration function provided by the kernel. Whether the cache is hot may be detected by invoking a task hot function provided by the kernel.

In specific implementation, all tasks that can be migrated may be identified at a time, and then migration is performed. Alternatively, tasks in a VIP queue may be sequentially processed.

Wait duration of a task is a time difference between a current time of the task and an enqueue time of the task, provided that the task has never been run during the duration. Alternatively, wait duration of a task is a time difference between a current time and a last run time of the task.

A lock of a queue usually needs to be obtained first to detect whether a wait time of a task in the queue exceeds a threshold. The foregoing method is implemented before the clock interrupt arrives, so that a deadlock can be avoided to an extent.

Figure 14:
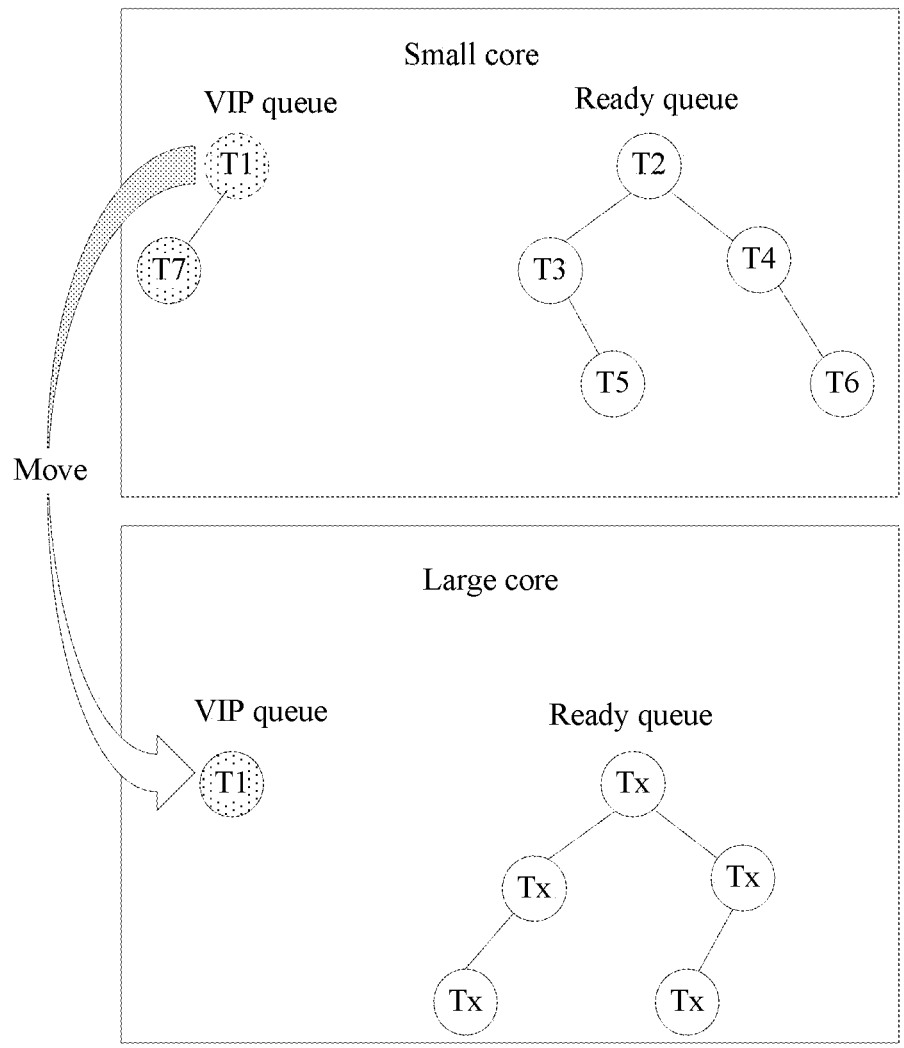
FIG. 14 is an example diagram of a queue change related to task moving.

When a task is moved, the task may be moved to a CPU having higher processing efficiency than that of an original CPU. In this manner, processing efficiency of an important task can be further improved. For example, eight cores (a CPU 0 to a CPU 7) of a current terminal device are usually classified into two levels: four small cores and four large cores. If an original CPU is a small core during migration, a large CPU may be selected as a destination CPU, and an important task is migrated to the destination CPU, as shown in FIG. 14.

A VIP queue is created for each CPU, and an important task is placed in the queue, so that the important task is executed prior to another task in a ready queue, thereby ensuring execution efficiency of the important task. Because the important task is related to stalling experience of the system, system stalling that can be sensed by a user can be avoided to an extent, thereby improving user experience of the terminal device.

It should be noted that the modules or module division proposed in the foregoing embodiments is merely shown as an example, and the described functions of the modules are merely examples for description. This application is not limited thereto. A programmer may combine functions of two or more of the modules according to a requirement, or split a function of one module to obtain more fine-grained modules, or may use another transformation manner.

For same or similar parts in the foregoing described embodiments, reference may be made to these embodiments.

The described apparatus embodiments are merely examples. The modules described as separate parts may or may not be physically separated, and parts shown as modules may or may not be physical modules, may be located in one position, or may be distributed on a plurality of network modules. Some or all of the modules may be selected according to actual needs to achieve the objectives of the solutions of the embodiments. In addition, in the accompanying drawings of the apparatus embodiments provided in this application, connection relationships between modules indicate that the modules have communication connections to each other, which may be specifically implemented as one or more communications buses or signal cables. A person of ordinary skill in the art may understand and implement the embodiments of this application without creative efforts.

The foregoing descriptions are merely some specific implementations of this application, but are not intended to limit the protection scope of this application.

What is claimed is:

1. A method for managing a resource in a computer system, comprising:
   obtaining data, wherein the data comprises application sequence feature data related to a current foreground application, and the data further comprises at least one of the following real-time data: a current time of the computer system, current status data of the computer system, or current location data of the computer system;
   selecting, from a plurality of machine learning models based on at least one of the real-time data, a target machine learning model that matches the real-time data;
   inputting the obtained data into the target machine learning model to rank a plurality of applications installed in the computer system according to their importance;
   determining a quantity N of applications whose resources are to be protected, wherein a value of N meets the following condition: a ratio of a quantity of times of using N applications that are most frequently used in a past period of time to a sum of quantities of times of using all applications in the period of time is greater than a preset first threshold, and N is an integer greater than 0; and
   performing resource management based on N and the importance ranking.

2. The method according to claim 1, wherein the obtained data comprises the system time of the computer system; and
   the selecting the target machine learning model that matches the real-time data comprises:
   determining the current time; and
   determining, from a correspondence based on time periods, a target machine learning model corresponding to the current time, wherein the correspondence comprises a plurality of time periods and a plurality of machine learning models respectively corresponding to the plurality of time periods.

3. The method according to claim 1, wherein the obtained data comprises the current location data of the computer system; and
   the selecting the target machine learning model that matches the real-time data comprises:
   determining a semantic location at which the computer system is currently located; and
   determining, from a correspondence based on the semantic location at which the computer system is currently located, a target machine learning model corresponding to the semantic location at which the computer system is currently located, wherein the correspondence comprises a plurality of semantic locations and a plurality of machine learning models respectively corresponding to the plurality of semantic locations.

4. The method according to claim 1, further comprising:
   collecting and storing application data and related data of the computer system, wherein the application data comprises an identifier of the application and a time when the application is used, and the related data of the computer system comprises at least one of the following data: a time, status data, and location data that are of the computer system at the time when the application is used.

5. The method according to claim 4, further comprising:
   obtaining, through calculation, application sequence feature data of a plurality of applications based on the application data collected and stored in a period of time in the past;
   inputting the application data, or the application data and the related data of the computer system into a classification model, to obtain a plurality of categories related to patterns of use for the application, wherein the plurality of categories are one-dimensional categories or multi-dimensional categories, and any two categories respectively correspond to two different patterns of use; and
   training a first machine learning model for each of the plurality of categories, wherein:
   the first machine learning model is used to rank importance of applications,
   inputs for the training comprise the time when the application is used and the application sequence feature data, and
   inputs for the training further comprise the related data of the computer system.

6. The method according to claim 5, wherein the plurality of categories are a plurality of categories classified in a time dimension.

7. The method according to claim 6, wherein the plurality of categories comprise a working time period and a non-working time period.

8. The method according to claim 4, wherein the collecting step is started when one or more of the following events are detected: a foreground-background switching event, an application installation event, an application uninstallation event, a notification event caused by a change in the status of the computer system, or a notification event caused by a change in the location of the computer system.

9. The method according to claim 1, comprising:
starting the step of obtaining data when one or more of the following events are detected: a foreground-background switching event, an application installation event, an application uninstallation event, a notification event caused by a change in the status data of the computer system, or a notification event caused by a change in the location data of the computer system.

10. The method according to claim 1, wherein the performing resource management based on N and the result of the importance ranking comprises:
identifying, from the result of the importance ranking, N1 applications that are ranked at the top, and performing resource management on the N1 applications or another remaining application, wherein N1 is a positive integer less than or equal to N.

11. The method according to claim 1, further comprising:
ranking importance of newly installed applications based on weights of the newly installed applications, and selecting N2 newly installed applications that are ranked at the top from the newly installed applications, wherein a time when the newly installed applications are installed in the computer system is less than a preset second threshold; and
correspondingly, the performing resource management based on N and the result of the importance ranking comprises:
identifying, from the result of the importance ranking, between N and N2 applications that are ranked at the top, and performing resource management on both the N to N2 applications ranked at the top and the N2 newly installed applications.

12. The method according to claim 11, wherein the ranking importance of newly installed applications based on weights of the newly installed applications comprises:
calculating a score of each newly installed application based on a use possibility weight and a time attenuation weight, wherein importance of a newly installed application with a high score is higher than importance of a newly installed application with a low score, wherein the use possibility weight is used to reflect whether the newly installed application has recently been used, and the time attenuation weight is used to reflect a time difference between a current time and a time when the application is installed.

13. The method according to claim 1, wherein the performing resource management based on a result of the importance ranking comprises one or more of the following management actions:
reserving a resource for an identified application with high importance;
temporarily freezing an identified application with low importance until a specific time ends; and
creating a high importance queue for each central processing unit (CPU), wherein the high importance queue comprises a task of an application with high importance, and execution of each task in the high importance queue takes precedence over that of another execution queue of the CPU.

14. The method according to claim 1, wherein the application sequence feature data comprises k1 recently used applications, k2 most likely pre-order applications in the foreground application, and k3 most likely post-order applications in the foreground application, wherein k1, k2, and k3 are all positive integers.

15. The method according to claim 1, wherein the current location data is semantic location data.

16. The method according to claim 1, wherein the current status data is one or more of the following data: data indicating a network connection or a network disconnection, data indicating a headset connection or disconnection, data indicating a charging cable connection or disconnection, and data indicating a Bluetooth connection or disconnection.

17. A terminal device, wherein the terminal device comprises a processor and a non-transitory memory, the non-transitory memory is configured to store computer readable instructions, and the processor is configured to read the computer readable instructions stored in the memory to implement:
obtaining data, wherein the data comprises application sequence feature data related to a current foreground application, and the data further comprises at least one of the following real-time data: a current time of the computer system, current status data of the computer system, or current location data of the computer system;
selecting, from a plurality of machine learning models based on at least one of the real-time data, a target machine learning model that matches the real-time data;
inputting the obtained data into the target machine learning model to rank a plurality of applications installed in the computer system according to their importance;
determining a quantity N of applications whose resources are to be protected, wherein a value of N meets the following condition: a ratio of a quantity of times of using N applications that are most frequently used in a past period of time to a sum of quantities of times of using all applications in the period of time is greater than a preset first threshold, and N is an integer greater than 0; and
performing resource management based on N and the importance ranking.

18. The terminal device according to claim 17, wherein the obtained data comprises the system time of the computer system; and the processor is further configured to read the computer readable instruction stored in the memory to implement:
determining the current time; and
determining, from a correspondence based on time periods, a target machine learning model corresponding to the current time, wherein the correspondence comprises a plurality of time periods and a plurality of machine learning models respectively corresponding to the plurality of time periods.

19. The terminal device according to claim 17, wherein the obtained data comprises the current location data of the computer system; and the processor is further configured to read the computer readable instructions stored in the memory to implement:
determining a semantic location at which the computer system is currently located; and
determining, from a correspondence based on the semantic location at which the computer system is currently located, a target machine learning model corresponding to the semantic location at which the computer system is currently located, wherein the correspondence comprises a plurality of semantic locations and a plurality of machine learning models respectively corresponding to the plurality of semantic locations.

\* \* \* \* \*